United States Patent
Toyama et al.

(10) Patent No.: US 6,551,188 B2
(45) Date of Patent: Apr. 22, 2003

(54) VIDEO GAME DEVICE, NEW PRACTICE CREATING METHOD AND READABLE STORAGE MEDIUM STORING NEW PRACTICE CREATING PROGRAM

(75) Inventors: Akira Toyama, Suita (JP); Toshimitsu Aoki, Edogawa-ku (JP); Hiroshi Tanibuchi, Nishinomiya (JP)

(73) Assignee: KCEO Inc., Osaka (JP)

( * ) Notice: Subject to any disclaimer, the term of this patent is extended or adjusted under 35 U.S.C. 154(b) by 152 days.

(21) Appl. No.: 09/837,068

(22) Filed: Apr. 18, 2001

(65) Prior Publication Data

US 2001/0034267 A1 Oct. 25, 2001

(30) Foreign Application Priority Data

Apr. 20, 2000 (JP) ........................ 2000-119071

(51) Int. Cl.$^7$ .............................. A63F 9/24; G06F 17/00
(52) U.S. Cl. ................. 463/31; 463/3; 463/43
(58) Field of Search ................ 463/2, 3, 4, 23, 463/31, 43; 473/422, 451, 459

(56) References Cited

U.S. PATENT DOCUMENTS 5,816,953 A * 10/1998 Cleveland .............. 463/3 X
6,155,924 A * 12/2000 Nakagawa et al. ........... 463/4

FOREIGN PATENT DOCUMENTS

JP 11-207036 8/1999

OTHER PUBLICATIONS

Pp. 168,153–154, 150 of "Konami Official Guide perfect series, perfect guidance for a broadcaster powerful professional baseball game 1999, opening game version" published by Konami Corporation on Aug. 21, 1999.

* cited by examiner

Primary Examiner—Tony M. Argenbright
(74) Attorney, Agent, or Firm—Jordan and Hamburg LLP

(57) ABSTRACT

A player is able to train a game character in a strategic manner, and hence a game generating a high degree of interest can be executed. Practice feature names of plural types are displayed in a list on a monitor 22 by means of basic practice feature display 113, and one practice feature name is selected by moving and displaying a cursor over one practice feature name of the displayed practice feature names, by means of cursor movement display 112, and furthermore, item names of plural types are displayed in a list on the monitor 22 by means of item display 114, and one item name is selected by moving and displaying a cursor over one item name of the displayed item names, by means of cursor movement display 112, whereby a new practice is created by a new practice creating device.

9 Claims, 29 Drawing Sheets

FIG.15

PLAYER CREATION

RIGHT OR LEFT HANDED ?

| NAME | ITO |
|---|---|

| TEAM | OREX |
|---|---|
| CALLS SELF | I |
| LEFT / RIGHT HANDED | THROWS RIGHT / BATS LEFT |

| FIELDING | |
|---|---|
| FORM | |
| INTERESTS | |

END

| THROWS RIGHT / BATS RIGHT | THROWS RIGHT / BATS LEFT | THROWS RIGHT / BATS BOTH |
|---|---|---|
| THROWS LEFT / BATS RIGHT | THROWS LEFT / BATS LEFT | THROWS LEFT / BATS BOTH |

|  | ITO | | Ox | SHIRT NUMBER | 50 | FEB /WEEK 1 |
|---|---|---|---|---|---|---|
| | FIRST YEAR | 24 YEARS OLD | PHYSICAL CONDITION | ☺ EAGERNESS | ☹ | |

" I'M GOING TO DO SOME TRAINING AT CAMP "

| CAMP | RECOVERY | | IMPROVE ABILITY | PERSONAL DATA | EVALUATION | SPECIAL TRAINING CREATION | |

FIG.17

| | ITO | | | | Ox | SHIRT NUMBER | 50 | |
|---|---|---|---|---|---|---|---|---|
| | FIRST YEAR | 24 YEARS OLD | PHYSICAL CONDITION | ☺ | EAGERNESS | ☹ | | FEB /WEEK 2 |

" I'M GOING TO DO SHORT SPRINTS "

| BATTING | BATTING TEE | SPRINTING | RUN -IN | BATTING FOR FIELDING PRACTICE | REAL FIELDING | MUSCLE TRAINING | RETURN |

FIG.18

| | ITO | | | O× | SHIRT NUMBER | 50 | |
|---|---|---|---|---|---|---|---|
| (face icon) | FIRST YEAR | 24 YEARS OLD | PHYSICAL CONDITION | ☺ | EAGERNESS | ☹ | FEB /WEEK 3 |

" I'M DROPPING OUT FROM NOW "

| BREAK | PLAY | | | | | | RETURN |

FIG.23

5TH TURN AT BAT

FLY BALL     SWING AND MISS     STRIKE OUT     HIT

FIG.25

IMPROVING ABILITY

| | STRENGTH | AGILITY | TECHNIQUE |
|---|---|---|---|
| REMAINING EXPERIENCE POINTS | 36 | 65 | 44 |

| | | | | CURRENT ABILITY | AFTER CHANGE |
|---|---|---|---|---|---|
| RETURN | | | | | |
| MEET CIRCLE | 10 | | 20 | D | D |
| BATTING POWER | 4 | | | 65 | → 65 |
| RUNNING STRENGTH | | 40 | 10 | 8D | → 8D |
| SHOULDER STRENGTH | 24 | 5 | 5 | 8D | → 8D |
| FIELDING | | 10 | 32 | 8D | → 8D |
| CHANCE | 15 | 15 | 15 | | |

MEET CURSOR SIZE WHEN BATTING

FIG.26

IMPROVING ABILITY

|  | STRENGTH | AGILITY | TECHNIQUE |
|---|---|---|---|
| REMAINING EXPERIENCE POINTS | 0 | 2 | 2 |

CURRENT ABILITY    AFTER CHANGE

| | STRENGTH | AGILITY | TECHNIQUE |
|---|---|---|---|
| AGAINST LEFT-HANDED PITCHER | 15 | 15 | 15 |
| BUNT | | | 30 |
| INFIELD HIT | | 80 | 40 |
| POWER BATTER | 80 | 20 | 30 |
| AVERAGE HITTER | 30 | 20 | 30 |
| SLIDING HEAD FIRST | | 20 | 20 |
| STEALING BASE | | | |

SLIDES INTO FIRST BASE IN RISKY SITUATIONS

FIG.27

IMPROVING ABILITY

|  | STRENGTH | AGILITY | TECHNIQUE |
|---|---|---|---|
| REMAINING EXPERIENCE POINTS | 4 | 50 | 7 |

RETURN

|  |  |  |  | CURRENT ABILITY | AFTER CHANGE |
|---|---|---|---|---|---|
| MEET CIRCLE | 10 |  | 30 | D | D |
| BATTING POWER | 4 |  |  | 65 | → 67 |
| RUNNING STRENGTH |  | 40 | 10 | 8D | → 8D |
| SHOULDER STRENGTH | 24 | 5 | 5 | 8D | → 9D |
| FIELDING |  | 10 | 32 | 8D | → 9D |
| CHANCE | GAINED |  |  |  |  |

STRENGTH TO HIT THE LONG BALL

VIDEO GAME DEVICE, NEW PRACTICE CREATING METHOD AND READABLE STORAGE MEDIUM STORING NEW PRACTICE CREATING PROGRAM

BACKGROUND OF THE INVENTION

1. Field of the Invention

The present invention relates to a video game device whereby a game character on a game screen is caused to undertake simulated experiences in place of the player (role-playing games), and to a new practice creating method and readable storage medium storing a new practice creating program.

2. Description of the Related Art

As role-playing games wherein a player is able to cause a game character on a game screen to undertake simulated experiences, there are known training-style games wherein a game character develops whilst repeatedly engaging in contents with opponent character in a variety of scenes. Moreover, there are also known games wherein individual characteristics are imparted to the game character by differential allocation of abilities of plural types from overall ability values.

However, in the aforementioned training-style game, although the various abilities of the game character are increased as the game character competes with the opponent characters, the factors in the development of the character's abilities depend solely on the state of the competition with the opponent character, and hence the same results are always obtained, thereby detracting from the interest of the game. Moreover, if the various abilities are set for the game character by being allocated differentially, then a character simply having abilities set according to the instructions of the player is obtained, and hence there is little variation and the game loses interest for the player. Furthermore, if the abilities of the game character are improved by means of practice, then since this practice has previously determined contents, limits naturally occur to the potential increase in the abilities of the game character, and hence the game will lose interest for the player.

SUMMARY OF THE INVENTION

The present invention was devised with the foregoing in view, an object thereof being to provide a video game device, a new practice creating method for a video game, and a readable storage medium storing a new practice creating program, whereby a player is able to train a game character in a strategic manner, and hence is able to play a highly interesting game.

In order to achieve the aforementioned objects, a first aspect of the present invention is a video game device, wherein the abilities of a game character displayed on a monitor are caused to improve by executing predetermined specific practices during the course of a game in which the game character is caused to approach training target values by performing actions corresponding to instructions from an operating member, comprising: practice selecting means for selecting one practice feature from predetermined practice features of plural types; item selecting means for selecting one item from predetermined items of plural types; and new practice creating means for creating a practice having new contents by combining a selected practice feature and item; wherein the operating member can instruct performance of a practice created by the new practice creating means.

Moreover, second and third aspects of the present invention are a new practice creating method and a readable storage medium storing a new practice creating program, for a video game, wherein the abilities of a game character displayed on a monitor are caused to improve by executing predetermined specific practices during the course of a game in which the game character is caused to approach training target values by performing actions corresponding to instructions from an operating member, the above method and program comprising: a first step of selecting one practice feature from predetermined practice features of plural types; a second step of selecting one item from predetermined items of plural types; and a third step of creating a practice having new contents by combining a selected practice feature and item.

According to this composition and method, one practice feature is selected from predetermined practice features of plural types, one item is selected from predetermined items of plural types, and a practice having new contents corresponding to the selected practice feature and item is created. Therefore, by creating new practices during the course of a game, the player is able to train a game character forming a new player character by improving the abilities of the game character, and hence interest generated by the game is raised.

These and other objects, features and advantages of the present invention will become more apparent upon reading of the following detailed description along with the accompanied drawings.

BRIEF DESCRIPTION OF THE DRAWINGS

FIG. 15 is a diagram illustrating a game screen displayed on the monitor of the video game system shown in FIG. 1;

FIG. 17 is a diagram illustrating a game screen displayed on the monitor of the video game system shown in FIG. 1;

FIG. 18 is a diagram illustrating a game screen displayed on the monitor of the video game system shown in FIG. 1;

FIG. 23 is a diagram illustrating a game screen displayed on the monitor of the video game system shown in FIG. 1;

FIG. 25 is a diagram illustrating a game screen displayed on the monitor of the video game system shown in FIG. 1;

FIG. 26 is a diagram illustrating a game screen displayed on the monitor of the video game system shown in FIG. 1;

FIG. 27 is a diagram illustrating a game screen displayed on the monitor of the video game system shown in FIG. 1;

DESCRIPTION OF THE PREFERRED EMBODIMENTS

Figure 1:
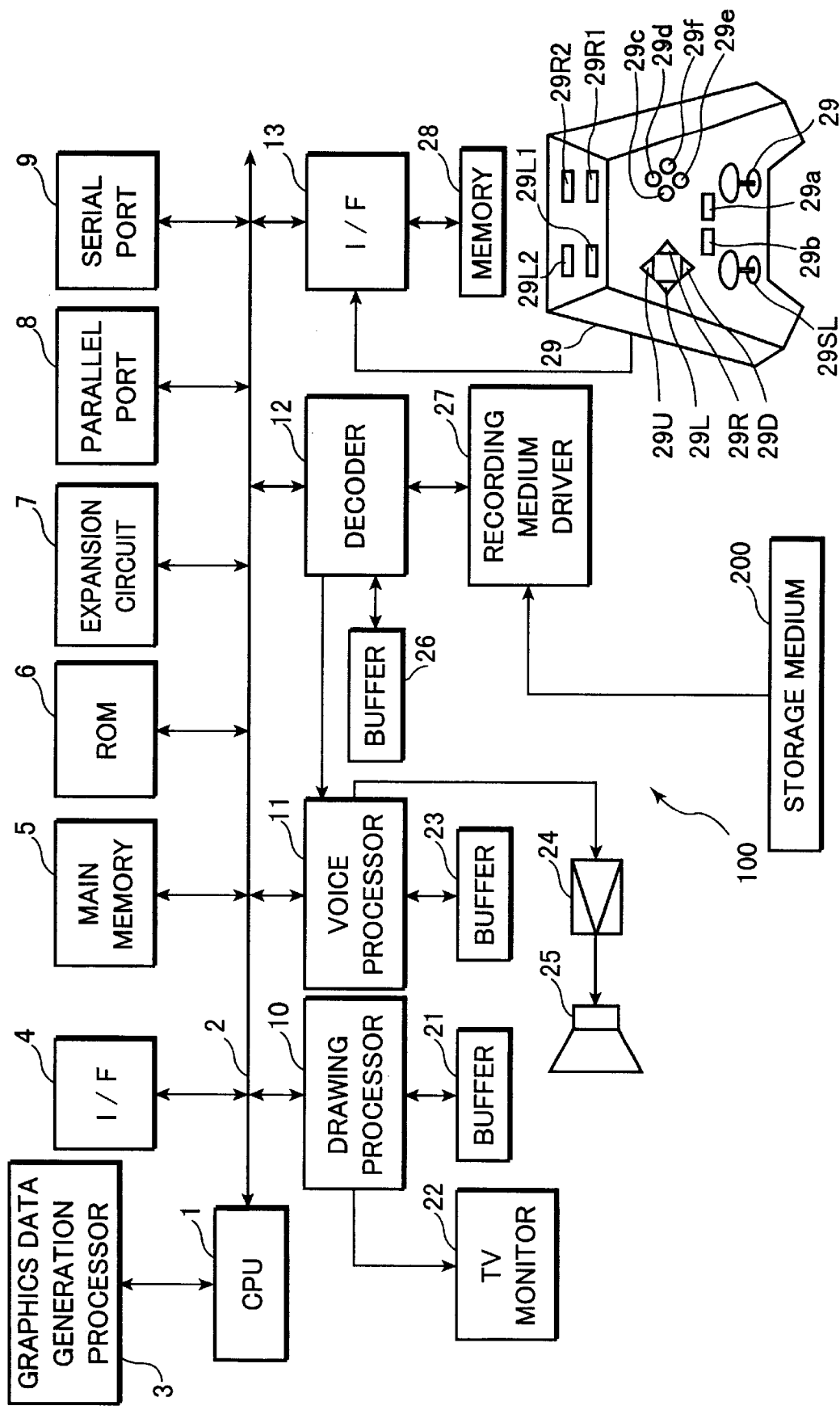
FIG. 1 is a diagram showing the composition of a video game system relating to one embodiment of the present invention.

FIG. 1 is a block diagram showing the electrical composition of a video game system (video game device) in which the new practice creating method relating to one embodiment of the present invention is applied. This game system comprises a game device main unit 100 and a storage medium 200 storing program data. The game device main unit 100 comprises a CPU 1, a bus line 2 consisting of an address bus, data bus and control bus, connected to the CPU 1, and a graphics data generating processor 3.

An interface circuit 4, main memory 5 consisting of a RAM, and the like, ROM 6, expansion circuit 7, parallel port 8, serial port 9, drawing processor 10, sound processor 11, decoder 12, and interface circuit 13 are connected to the bus line 2.

The drawing processor 10 is connected to a buffer 21 and to a video monitor (hereinafter, called "monitor") 22, and the sound processor 11 is connected to a buffer 23 and to a speaker 25, via an amplifier circuit 24. Moreover, the decoder 12 is connected to a buffer 26 and a storage medium driver 27, and the interface circuit 13 is connected to a memory 28 and a controller 29.

The modes of this game system vary depending on different applications thereof. For example, in cases where the game system is constituted for domestic use, the monitor 22 and speaker 25 are formed separately from the game device main unit 100. On the other hand, if the game system is constituted for commercial use, then the constituent element illustrated in FIG. 1 are all accommodated in an integrated fashion inside a single casing.

Furthermore, if this game system is being constituted on the basis of a personal computer or work station, then the monitor 22 corresponds to the computer display, the drawing processor 10, sound processor 11 and expansion circuit 7 respectively correspond to a part of the program data stored in the storage medium 200, or to hardware on an expansion board mounted on an expansion slot of the computer, and the interface circuit 4, parallel port 8, serial port 9 and interface circuit 13 correspond to hardware on an expansion board mounted on an expansion slot of the computer. Furthermore, the buffers 21, 23, 26 correspond respectively areas of the main memory 5 or expanded memory (not illustrated). The present embodiment is described with reference to an example wherein the game system is constituted for domestic use.

Next, the respective constituent elements shown in FIG. 1 will be described. The graphics data generating processor 3 performs the role of a co-processor of the CPU 1. In other words, the graphics data generating processor 3 performs co-ordinates conversions and light source calculations, for example, fixed point matrix and vector calculations, by parallel processing. The main processing performed by this graphics data generating processor 3 is to determine an address on a display area of an image under processing, on the basis of the co-ordinates data, amount of movement data and amount of rotation data, for each vertex of image data supplied from the CPU 1 in a two-dimensional or three-dimensional space, and to return this address data to the CPU 1, in addition to calculating the luminosity of the image in accordance with the distance thereof from an imaginary specified light source.

The interface circuit 4 serves as an interface for peripheral devices, for instance, pointing devices such as a mouse, tracker ball, or the like. Program data forming the operating system for the game system is stored in the ROM 6. This corresponds to the BIOS (Basic Input Output System) of a personal computer.

The expansion circuit 7 performs expansion processing for compressed images which have been compressed according to an intra-coding, based on MPEG (Moving Picture Engineering Group) standards for moving pictures or JPEG (Joint Picture Engineering Group) standards for still pictures. This expansion processing involves decode processing (decoding data encoded by VLC:Variable Length Code), inverse quantization processing, IDCT (Inverse Discrete Cosine Transform) processing, intra image restoration processing, and the like.

The drawing processor 10 performs drawing processing to the buffer 21 on the basis of drawing commands issued by the CPU 1 at prescribed time intervals T (one frame, for example, T=1/60 seconds).

The buffer 21 consists of a RAM, for example, which comprises a display area (frame buffer) and a non-display area. The display area comprises a data development area for displaying data on the display screen of the monitor 22. In the present embodiment, the non-display area comprises a storage area for storing data defining skeletons, model data defining polygons, animation data for causing movement of models, pattern data for indicating the details of each animation, and also texture data, colour palette data, and the like.

Here, the texture data is two-dimensional image data. The colour palette data is data for indicating the colours of the texture data, and the like. These data items are read out once, or in plural operations matching the state of development of the game, from the storage medium 200, by the CPU 1, and stored in the non-display area of the buffer 21.

The drawing commands include a drawing command for drawing three-dimensional images by means of polygons and a drawing command for drawing normal two-dimensional images. Here, a polygon is a polygonal two-dimensional imaginary figure, and in the present embodiment, triangular polygons are used.

A drawing command for drawing a three-dimensional image by means of polygons comprises: polygon vertex address data on the display area of the buffer 21, texture address data indicating the storage position in the buffer 21 of the texture data to be applied to the polygons, colour palette address data indicating the storage position in the buffer 21 of the colour palette data indicating the colours of the texture data, and luminosity data indicating the luminosity of the texture.

Of these data items, the polygon vertex address data on the display area is derived by means of the graphics data generating processor 3 converting the polygon vertex co-ordinates data in a three-dimensional space, as received from the CPU 1, into two-dimensional polygon vertex co-ordinates data, by co-ordinates conversion on the basis of the amount of movement data and the amount of rotation data for the screen. Furthermore, the luminosity data is determined by the graphics data generating processor 3 from the position indicated by the polygon vertex co-ordinates data from the CPU 1 having undergone the aforementioned co-ordinates conversion, on the basis of the distance thereof from a imaginarily situated light source.

The aforementioned polygon vertex address data indicates an address on the display area of the buffer 21, and the drawing processor 10 conducts processing for writing texture data corresponding to the scale of the display area on the buffer 21 indicated by three polygon vertex address data elements.

One object is made up of a multiplicity of polygons. The CPU 1 associates the three-dimensional space co-ordinates data for each polygon with corresponding skeleton vector data, and stores same in the buffer 21. If the character is caused to move on the display screen, by operation of the controller 29, in other words, if movement of the character itself is to be represented, or if the viewpoint position from which the character is observed is to be changed, then processing of the following kind is implemented.

Specifically, the CPU 1 supplies three-dimensional co-ordinates data for the vertices of each polygon, as stored in the non-display area of the buffer 21, to the graphics data generating processor 3, along with amount of movement data and amount of rotation data for each polygon as determined from the co-ordinates of the skeleton and the amount of rotation data for same.

The graphics data generating processor 3 then successively determines the three-dimensional co-ordinates data for each polygon, after movement and after rotation, on the basis of the three-dimensional co-ordinates data for the vertices of each polygon, and the amount of movement data and amount of rotation data for each polygon.

Of the three-dimensional co-ordinates data for each polygon thus derived, the horizontal and vertical direction co-ordinates data are supplied to the drawing processor 10 as address data for the display area of the buffer 21, in other words, as polygon vertex address data.

The drawing processor 10 writes texture data as indicated by the previously assigned texture address data onto the triangular display area of the buffer 21 indicated by the three polygon vertex address data elements. Thereby, an object wherein texture data is attached to a plurality of polygons is displayed on the display screen of the monitor 22.

A drawing command for drawing normal two-dimensional images comprises vertex address data, texture address data, colour palette address data indicating a storage location in the buffer 21 of colour palette data specifying the colours of the texture data, and luminosity data indicating the luminosity of the texture. Of these data elements, the vertex address data is co-ordinates data obtained by means of the graphics data generating processor 3 performing co-ordinates conversion of two-dimensional plane vertex co-ordinates data from the CPU 1, on the basis of amount of movement data and amount of rotation data supplied by the CPU 1.

The sound processor 11 stores ADPCM data read out from the storage medium 200, in the buffer 23, and this ADPCM data stored in the buffer 23 is used as a sound source. The sound processor 11 reads out the ADPCM data on the basis of a clock signal of 44.1 kHz frequency, for example.

The sound processor 11 performs processing of the ADPCM data read out from the buffer 23, such as pitch conversion, noise addition, envelope setting, level setting, reverb addition, and the like.

If the sound data read out from the storage medium 200 is PCM data, such as CD-DA (Compact Disk Digital Audio) data, or the like, then this data is converted to ADPCM data by the sound processor 11.

Moreover, the processing of the PCM data by the program data is carried out directly in the main memory 5. The PCM data processed in the main memory 5 is supplied to the sound processor 11, converted to ADPCM data and then subjected to various processing, whereupon it is output as sound from the speaker 25.

The storage medium driver 27 is, for example, a CD-ROM drive, hard disk drive, optical disk drive, flexible disk drive, silicon disk drive, cassette medium read-out device, or the like.

The storage medium 200 is a CD-ROM, hard disk, optical disk, flexible disk, semiconductor memory, or the like.

The storage medium driver 27 reads out images, sound and program data from the storage medium 200, and supplies the read out data to the decoder 12. The decoder 12 performs error correction processing by means of ECC (Error Correction Code) on the data reproduced from the storage medium driver 27, and the error corrected data is then supplied to the main memory 5 or the sound processor 11.

The memory 28 consists of a holder and card type memory, for example. A card-type memory is a memory which stores various game parameters, in such a manner that the state of a game suspended at an intermediate stage of the game can be saved thereon, for example.

The controller 29 is an externally controllable operating means, which comprises: a first left button 29L1, second left button 29L2, first right button 29R1, second right button 29R2, up direction key 29U, down direction key 29D, left direction key 29L, right direction key 29R, start button 29a, select button 29b, first button 29c, second button 29d, third button 29e, fourth button 29f, left stick 29SL, and right stick 29SR, and it sends operating signals corresponding to controls performed by the player, to the CPU 1.

The up direction key 29U, down direction key 29D, left direction key 29L and right direction key 29R are used by the player to give commands to the CPU 1 for causing a character, cursor, or the like, to move upwards, downwards, leftwards or rightwards on the screen of the monitor 22.

The start button 29a is used by the game player to instruct the CPU 1 to start the game program data loaded from the storage medium 200. The select button 29b is used by the game player to indicate various selections to the CPU 1, relating to the game program data loaded from the storage medium 200 to the main memory 5.

On the controller 29, all of the buttons and keys apart from the left stick 29SL and the right stick 29SR are ON/OFF type switches which assume an ON state when pressed from a central position by means of an external force, and assume an OFF state, returning to the aforementioned central position, when the external pressure is released.

The left stick 29SL and right stick 29SR are stick-type controller having virtually the same composition as so-called joysticks. In other words, they comprise a upright stick which pivots about a prescribed position of the stick and can be inclined in any front, back, left or right direction in a 360° range. Furthermore, the values of an x co-ordinate in the left/right direction and a y co-ordinate in the front/back direction, taking the upright position as a point of origin, corresponding to the direction of inclination and the angle of inclination of the stick, are transmitted to the CPU 1 as operating signals, by means of an interface circuit 13.

The functions of the first left button 29L1, second left button 29L2, first right button 29R1 and second right button 29R2 vary according to the game program data loaded from the storage medium 200.

Next, the general operation of this game system will be described. The power switch (not illustrated) is switched on and power is supplied to the game system. In this case, if a storage medium 200 is loaded into the storage medium driver 27, then the CPU 1 will instruct the storage medium driver 27 to read out program data form the storage medium 200, on the basis of the operating system stored in the ROM 6. Thereby, the storage medium driver 27 reads out image, sound and program data form the storage medium 200. The read out image, sound and program data is supplied to the decoder 12, where error correction processing is performed.

The image data which has been error corrected by the decoder 12 is then supplied via the bus line 2 to the expansion circuit 7, where the aforementioned expansion processing is implemented, whereupon the data is supplied to the drawing processor 10 and then written by the drawing processor 10 to the non-display area of ht buffer 21.

Moreover, the sound data error corrected by the decoder 12 is either written to the main memory 5, or supplied to the sound processor 11 and written to the buffer 23.

The program data error corrected by the decoder 12 is written to the main memory 5. Thereupon, the CPU 1 develops the game on the basis of the game program data stored in the main memory 5, and the contents of the instructions given by the player by means of the controller 29. In other words, the CPU 1 performs image processing control, sound processing control and internal processing control, appropriately, on the basis of the contents of the instructions given by the player by means of the controller 29.

In the present embodiment, the image processing control involves, for instance, calculating respective skeleton co-ordinates and calculating polygon vertex co-ordinates data from the polygon data corresponding to the animation indicate for the character, supplying the obtained three-dimensional co-ordinates data and viewpoint position data to the graphics data generating processor 3, issuing drawing commands including the buffer 21 display area address data and luminosity data, as determined by the graphics data generating processor 3, and the like. The sound processing control involves, for example, issuing sound output commands to the sound processor 11, and setting levels, reverb, and the like. The internal processing control involves, for example, calculations corresponding to the operation of the control 29, and the like.

The image data which has been error corrected by the decoder 12 is supplied via the bus line 2 to the expansion circuit 7, where it is subjected to expansion processor and then supplied to the drawing processor 10, which writes the data to the non-display area of the buffer 21.

Moreover, the sound data which has been error corrected by the decoder 12 is either written to the main memory 5, or it is supplied to the sound processor 11 and written to the buffer 23.

Furthermore, the program data which has been error corrected by the decoder 12 is written to the main memory 5. Thereupon, the CPU 1 develops a game on the basis of the game program data stored in the main memory 5, and the contents of the instructions given by the player via the controller 29. In other words, the CPU 1 performs image processing control, sound processing control and internal processing control, appropriately, on the basis of the contents of the instructions given by the player via the controller 29.

Figure 2:
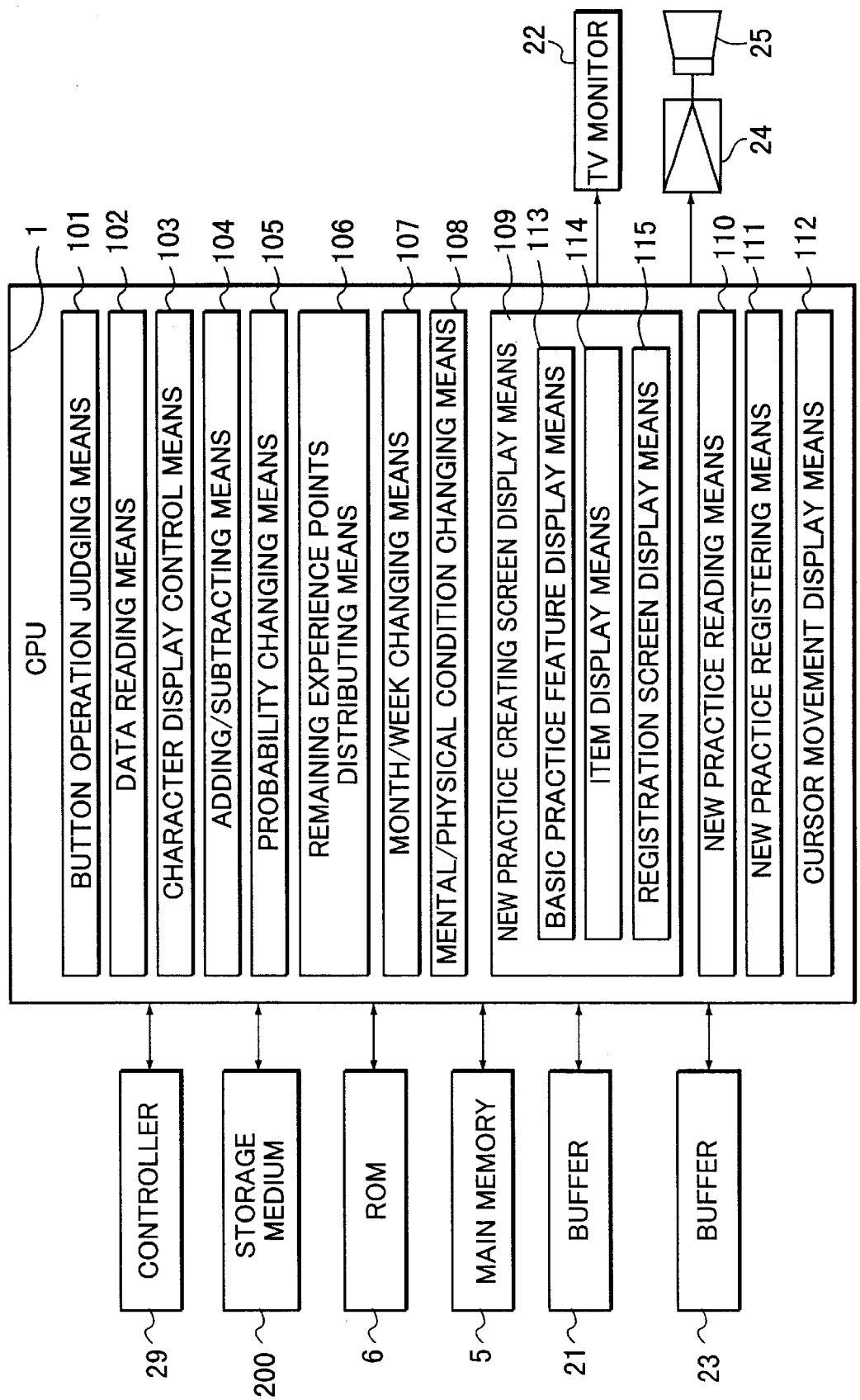
FIG. 2 is a block diagram showing the function executing means of the CPU in the video game system shown in FIG. 1.

FIG. 2 is a block diagram showing function executing means provided by the CPU 1 which forms the core of the operation of the video game system illustrated in FIG. 1, along with the main memory 5, buffers 21, 23, television monitor 22, speaker 25, controller 29 and storage medium 200. Here, in order to facilitate the description, the interface circuit, buses, and the like, have been omitted from the drawing.

In the present embodiment, a case is described where a baseball game is executed in the video game system, there being provided a success game for training a rookie selected by the game player, from a minor league player into a major league player, competitive games wherein a team is formed by baseball players trained by the game layer and a match is played against an opposing team, and the like. Furthermore, if a success game is selected, then the game player becomes able to create a practice having new contents, and can train the game character in a strategic manner by making the game character undertake the practice having new contents.

To achieve this, the CPU 1 comprises the various function executing means of: button judging means 101, data reading means 102, character display means 103, adding and subtracting means 104, probability changing means 105, remaining experience points distributing means 106, month and week changing means 107, mental and physical condition changing means 108, new practice creating screen display means 109, new practice reading means 110, new practice registering means 111 and cursor movement display means 113. Furthermore, the new practice creating screen display means 109 comprises the respective function executing means of: basic practice display means 113, item display means 114 and registration screen display means 115.

The button judging means 101 determines whether or not ON/OFF operations have been performed on the basis of operating signals from the buttons and switches of the controller 29. The data reading means 102 reads out game data from the storage medium 200, at one time or as the game progresses, on the basis of a game start signal, or the like, from the controller 29, and the game data read out thereby is stored in the main memory 5 and buffers 21, 23, and this game data is read out from the main memory 5 and buffers 21, 23 as the game progresses.

The character display control means 103 controls the display of game screens, such as the game character forming the trainee, other characters associated with this game character, background screens, and the like, and it displays game screens on the video monitor 22 on the basis of image data read out successively form the main memory 5 and buffer 21 by the data reading means 102.

The adding and subtracting means 104 adds a prescribed value to the "remaining experience points" which are points acquired by the character by accumulating a variety of skills, when the player selects "Camp" from the screen (described hereinafter), or alternatively, it deducts a prescribed value from the "remaining experience points" according to negative events occurring during the course of the game, or the like.

The probability changing means 105 sets the probability of an adding or subtracting operation by the adding and subtracting means 104, in a random manner, using the practice status at that "month and week" and the history of events, and the like, as probability variation factors, and incorporating these factors into the setting of the probability. For example, these factors may act to increase the probability if they are good or favourable, or conversely, they may act to decrease the probability (in the case of addition points). In practice, it is possible to handle values in a certain value range by adding or subtracting a matching value.

The remaining experience points distributing means 106 performs calculations for distributing the "remaining experience points" to the various types of "abilities". The types of "remaining experience points" include "strength", "agility" and "technique", and the respective points values of these can be increased according to the different types of practice in the "Camp" game and also by means of other factors.

The month and week changing means 107 causes time to pass, one week at a time, each time a prescribed operating button of the controller 29 is operated. The mental and physical condition changing means 108 causes the levels of conditions such as "physical condition" and "eagerness" to be represented respectively by facial expressions. The "physical condition" level decreases if excessive practice is performed in the "Camp" game, whereas it is increased, for example, by selecting "Recovery" on the menu screen, or by going into hospital due to an injury, or the like. The "eagerness" level may be increased, or alternatively decreased, by the "Camp" game and events in the game, and by selecting "Recovery" or "Telephone" on the menu screen, for example.

The new practice creating screen display means 109 reads out a screen for creating practice having new contents (new practice), from the main memory 5, and displaying same on the monitor 22. This new practice is set by combining one specific basic practice feature selected from a plurality of types of basic practice features previously prepared and stored in the storage medium 200 with one specific item selected from a plurality of types of items (objects held by the game character) previously prepared and stored in the storage medium 200. This newly set new practice is recorded in tabular form in the storage means 200 with respect to various combinations of basic practice features and items, and it is read into the main memory 5 when a game is started.

The new practice reading means 110 reads out a new practice set by combining one selected basic practice feature with one selected item, from the main memory 5. For example, a group name is assigned to a combination of one specific basic practice feature and one specific item, and the new practices are stored in tabular form by associating group names with respective new practices, and are read out using the group name as a key.

The new practice registering means 111 registers a new practice read out from the main memory 5 by the new practice reading means 110, in a prescribed region of the main memory 5 in accordance with an instruction from the player given by operating a prescribed button of the controller 29. The new practice registered in the main memory 5 can then be implemented by selected a prescribed button on the controller 29. When the player selects a new practice, then, for example, a game screen is displayed wherein the game character undertakes the new practice, and when the practice is completed, the player's abilities are upgraded according to the contents of the new practice undertaken, the probability generated by the probability changing means 105 is changed, and the distribution of "remaining experience points" acquired by the character is also changed. New practice creating means is constituted by the new practice reading means 110 and the new practice registering means 111.

The cursor movement display means 112 displays progressive movement of a cursor over a basic practice feature name and an item name (including icons) on the monitor 22, when prescribed button operations are received from the controller 29 to select a basic practice feature and an item. After moving the cursor to a position corresponding to a prescribed basic practice feature name or item name, by operating a confirmation button on the controller 29, the basic practice feature name or item name at the location where the cursor is displayed will be selected.

Figure 3:
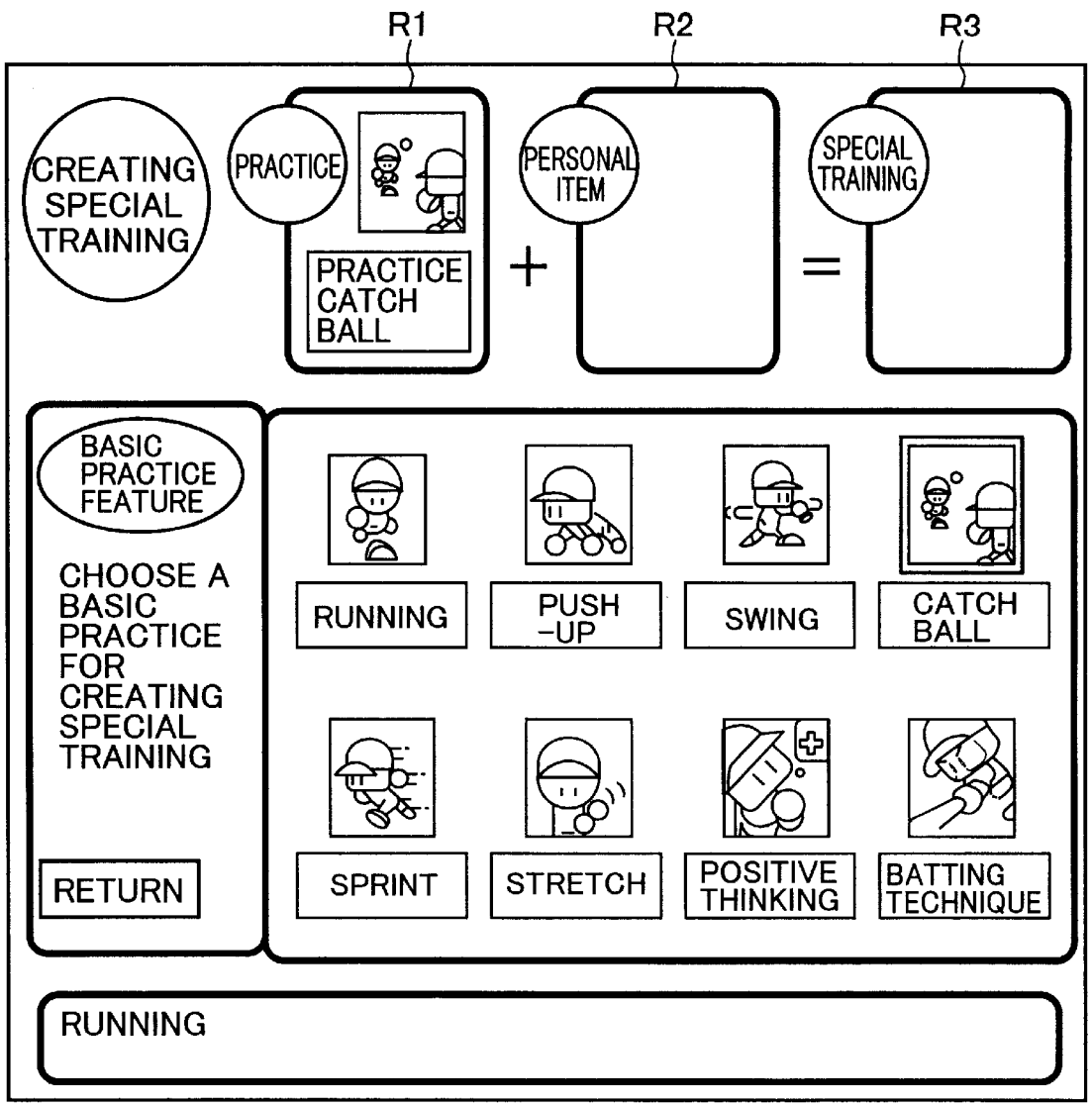
FIG. 3 is a diagram illustrating a screen for creating a new practice.
Figure 4:
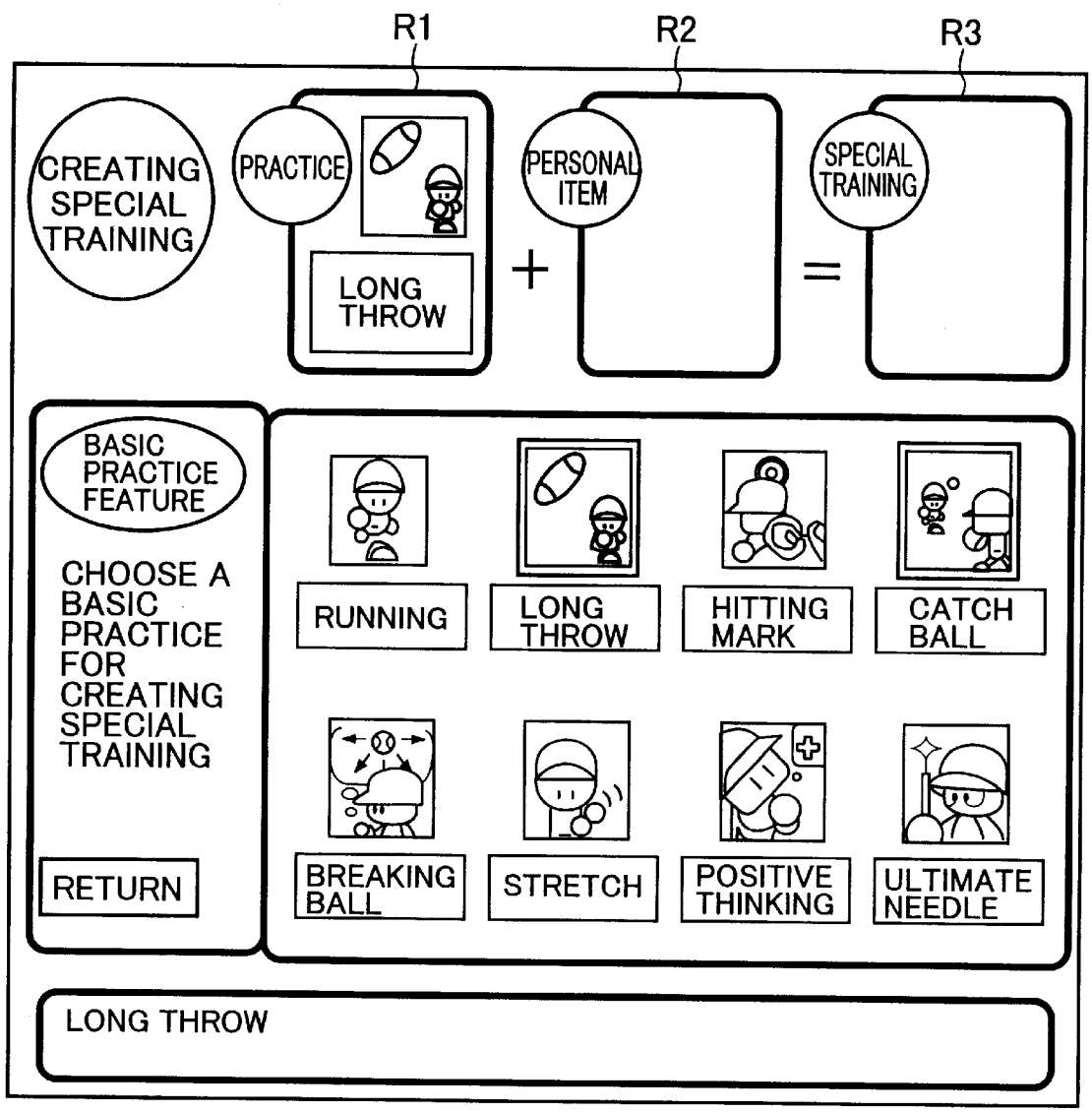
FIG. 4 is a diagram illustrating a screen for creating a new practice.

The basic practice display means 113 displays a list of icons labelled with the basic practice feature names illustrated in FIG. 3 or FIG. 4, in a grid fashion on the monitor 22, by reading same out from the main memory 5.

The screen shown in FIG. 3 relates to a case where the game character is a fielder, and basic practice features are displayed in the upper part of the centre column: a "Running" icon, "Push-up" icon, "Swinging" icon, and a "Catch ball" icon; and in the lower part of the centre column: a "Sprint" icon, "Stretch" icon, "Positive thinking" icon and a "Batting technique" icon. A particular one of these icons (in other words, a particular basic practice feature,) can be selected by progressively moving the displayed cursor to the right from the top left side, and then to the right from the bottom left side, by operating prescribed buttons on the controller 29.

Furthermore, the upper column of the screen shown in FIG. 3 comprises a region R1 (practice display region) where the selected basic practice feature is displayed, a region R2 (item display region) where the selected item is displayed, and a region R3 (new practice display region) where the new practice created by the combination of basic practice feature and item is displayed. Here, "Catch ball" is selected as a basic practice feature in the centre column, and a "Catch ball" icon is displayed in the practice display region R1.

Of the aforementioned basic practice features, "Running" is practice for improving basic physical strength by performing sufficient running practice, and "Push-up" is practice for further promoting physical strength by repeating push-ups. "Swinging" is practice for achieving a correct batting stance by repeating swinging of the bat, and "Catch ball" is practice for improving throwing ability and catching ability, by repeating throwing and catching a ball. "Sprint" is practice for improving base advancing ability by flat-out sprinting, and "Stretch" is practice for promoting physical strength by stretching all the muscles and joints of the body.

"Positive thinking" is practice for achieving better match results by taking events in a positive direction, and "Batting technique" is practice for improving batting technique so that the game character will be able to hit any kind of change ball, reliably. In the present embodiment, this "Batting technique" is displayed as a previously created new practice, and a further new practice can also be created by combining this new practice with another item. The various basic practice features described above are simply examples and the invention is not limited to these examples, it being possible to adopt various other practice features as required.

A "Return" button is displayed in the centre column and by clicking on this button, the player can return to the previous screen. Moreover, a message display region is provided in the lower column of the screen shown in FIG. 3, and the basic practice feature of the selected icon is displayed here, along with the practice contents corresponding to that basic practice feature, if necessary.

The screen shown in FIG. 4 relates to a case where the game character is a pitcher, and basic practice features are displayed in the upper part of the centre column: a "Running" con, "Long throw" icon, "Hitting mark" icon, and a "Catch ball" icon; and in the lower part of the centre column: a "Breaking ball practice" icon, "Stretch" icon, "Positive thinking" icon and a "Ultimate needle" icon. A particular one of these icons (in other words, a particular basic practice feature,) can be selected by progressively moving the displayed cursor to the right from the top left side, and then to the right from the bottom left side, by operating prescribed buttons on the controller 29. Furthermore, similarly to the case of FIG. 3, the upper column of the screen shown in FIG. 4 comprises a region R1 (practice display region) where the selected basic practice feature is displayed, a region R2 (item display region) where the selected item is displayed, and a region R3 (new practice display region) where the new practice created by the combination of basic practice feature and item is displayed. Here, "Long throw" is selected as a basic practice feature in the centre column, and a "Long throw" icon is displayed in the practice display region R1.

Of the aforementioned basic practice features, "Running", "Catch ball", "Stretch" and "Positive thinking" are the same practice features as the case of a fielder. "Long throw" is practice for adding throwing strength by throwing the ball a long distance, and "Hitting mark" is practice for improving ball control ability by aiming and pitching the ball from a prescribed position at a target located in front of the character. "Breaking ball practice" is practice for mastering new breaking balls by pitching a large number of breaking balls, and "Ultimate needle" is practice for pitching after the character's muscles have been relaxed by acupuncture, which is employed as part of the practice. In the present embodiment, this "Ultimate needle" is displayed as a previously created new practice, and a further new practice may also be created by combining this new practice with another item. The various basic practice features described above are simply examples and the invention is not limited to these examples, it being possible to adopt various other practice features as required.

A "Return" button is displayed in the centre column and by clicking on this button, the player can return to the previous screen. Moreover, a message display region is provided in the lower column of the screen shown in FIG. 4, and the basic practice feature of the selected icon is displayed here, along with the practice contents corresponding to that basic practice feature, if necessary. In both cases where the game character is a fielder or a pitcher, practice selecting means is constituted by the aforementioned cursor movement display means 112 and basic feature display means 113.

Figure 5:
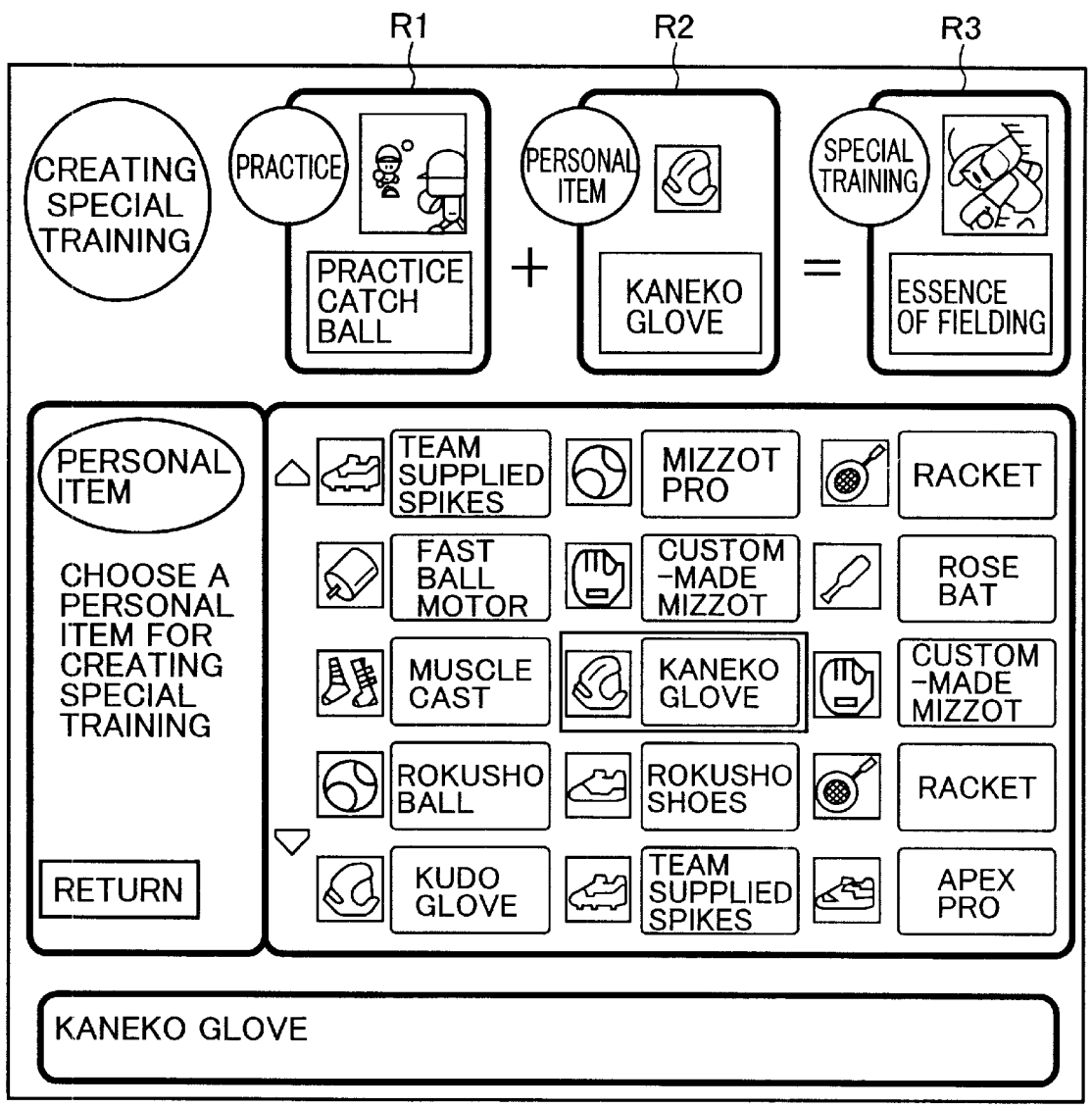
FIG. 5 is a diagram illustrating a screen for creating a new practice.
Figure 6:
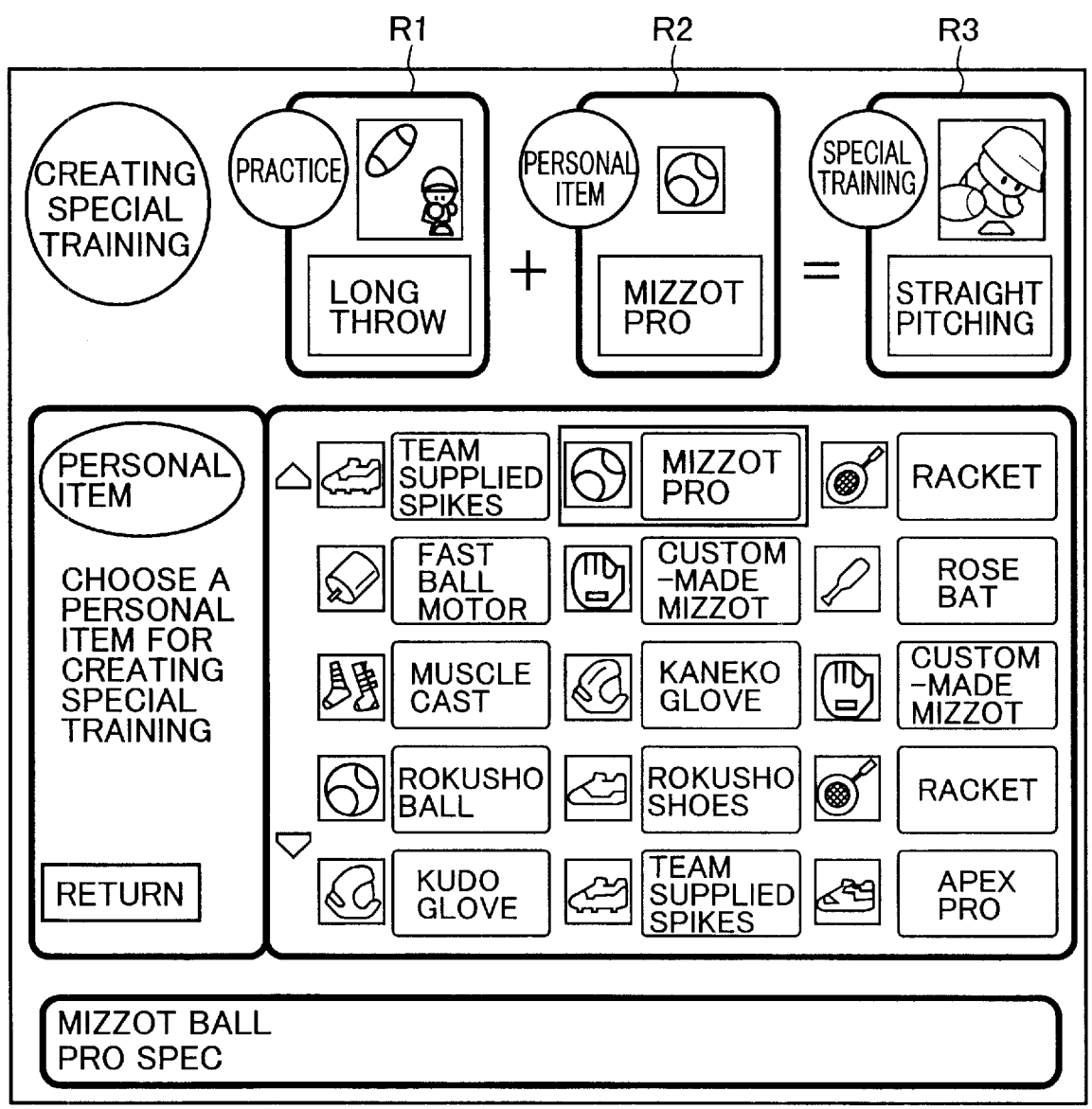
FIG. 6 is a diagram illustrating a screen for creating a new practice.

The item display means 114 displays a list of icons labelled with item names as illustrated in FIG. 5 or FIG. 6, in a grid fashion on the monitor 22, by reading same out from the main memory 5.

The screen shown in FIG. 5 relates to a case where the game character is a fielder, and a plurality of icons are displayed in the centre column thereof. Specifically, in the first line, a "Team supplied spikes" icon, a "Mizzot Pro" icon, and a "Racket" icon are displayed, in the second line, a "Fast Ball Motor" icon, "Custom-made Mizzot" icon, and "Rose Bat" icon are displayed, and in the third line, a "Muscle support" icon, "Kaneko glove" icon, and "Custom-made Mizzot" icon are displayed. Moreover, in the fourth line, a "Rokusho ball" icon, "Rokusho shoes" icon, and "Racket" icon are displayed, and in the fifth line, a "Kudo gloves" icon, "Team supplied spikes" icon, and "Apex Pro" icon are displayed. An even larger number of icons can be displayed by providing a scrollable display and scrolling up and down.

A prescribed icon (in other words, a particular item) can be selected by progressively moving the cursor from the left to the right of each line, by operating prescribed buttons of the controller 29. Moreover, the upper column of the screen shown in FIG. 5 comprises a region R1 (practice display region) where the selected basic practice feature is displayed, a region R2 (item display region) where the selected item is displayed, and a region R3 (new practice display region) where the new practice created by the combination of basic practice feature and item is displayed. Here the "Catch ball" icon is shown in the practice display region R1, and furthermore "Kaneko glove" is selected and a "Kaneko glove" icon is displayed in the item display region R2. Furthermore, a "Return" icon is displayed in the centre column, and by clicking on this button, the player can return to the previous screen. Moreover, a message display region is provided in the lower column of the screen shown in FIG. 5, and the item name of the selected icon is displayed here, along with a description of the item name, if necessary.

Of the aforementioned items, "Team supplied spikes" indicates spikes that are supplied by the team to which the character belongs, and "Mizzot Pro" indicates a ball made by Mizzot, which is an imaginary manufacturer. "Racket" indicates a tennis racket, and "Fast ball motor" indicates a motor which pitches fast balls, this being an imaginary object. "Custom-made Mizzot" indicates a specially ordered glove made by Mizzot which is an imaginary manufacturer, and "Rose Bat" indicates a bat belonging to a player Rose.

Furthermore, "Muscle Support" indicates a strap for supporting the muscles, and "Kaneko glove" indicates a glove belonging to a player Kaneko. "Rokkusho ball" indicates a ball made by an imaginary sports manufacturer, Rokusho, and "Rokusho shoes" indicates shoes made by an imaginary sports manufacturer Rokusho. "Kudo glove" indicates a glove belonging to a player Kudo, and "Apex Pro" indicates shoes made by an imaginary manufacturer, Apex.

The items are not limited to physical objects as described above, and may also include, for example, psychological factors generated by personal relationships, such as "affection", "trust", "display of friendship", "advice of seniors", and the like.

In this way, if "Catch ball" is selected as a basic practice feature and "Kaneko glove" is selected as an item, then the new practice reading means 110 reads out a practice having the name "Essence of Fielding" which is a corresponding new practice, from the main memory 5, and this read out new practice "Essence of fielding" is displayed on the new practice display region R3. This "Essence of fielding" is a practice which significantly increases the "fielding ability" of the character by performing fielding skill training, and by improving this "fielding ability", the probability of the probability changing means 105 will change, for example, and the distribution of the "remaining experience points" acquired by the character will also change.

Furthermore, the screen shown in FIG. 6 shows a case where the game character is a pitcher, and similarly to FIG. 5, a plurality of icons are displayed in a centre column and a particular one of these icons (in other words, a particular item,) can be selected by progressively moving the cursor from the left to the right of each line, by operating prescribed buttons of the controller 29.

Moreover, the upper column of the screen shown in FIG. 6 comprises a region R1 (practice display region) where the selected basic practice feature is displayed, a region R2 (item display region) where the selected item is displayed, and a region R3 (new practice display region) where the new practice created by the combination of basic practice feature and item is displayed. Here, the "long throw" icon is shown in the practice display region R1, and moreover, "Mizzot Pro" is selected and a "Mizzot Pro" icon is displayed in the item display region R2. Furthermore, a "Return" icon is displayed in the centre column, and by clicking on this button, the player can return to the previous screen. Moreover, a message display region is provided in the lower column of the screen shown in FIG. 5, and the item name of the selected icon is displayed here, along with a description of the item name, if necessary.

In this way, if "Long throw" is selected as a basic practice feature and "Mizzot Pro" is selected as an item, then the new practice reading means 110 reads out a practice having the name "Straight pitching" which is a corresponding new practice, from the main memory 5, and this read out new practice "Straight pitching" is displayed on the new practice display region R3. This "Straight pitching" is a practice which significantly increases the "pitching ability" of the character by performing special training involving repeated throwing of straight pitches, and by improving this "pitching ability", the probability of the probability changing means 105 will change, for example, and the distribution of the "remaining experience points" acquired by the character will also change. Item selecting means is constituted by the aforementioned cursor movement display means 112 and the item display means 114.

The registration screen display means 115 displays a screen for registering a new practice set newly by a combination of a selected basic practice feature and item, in the main memory 5. The screens in FIG. 7 to FIG. 9 relate to a case where the game character is a fielder, and the screens in FIG. 10 to FIG. 12 relate to a case where the game character is a pitcher.

Figure 7:
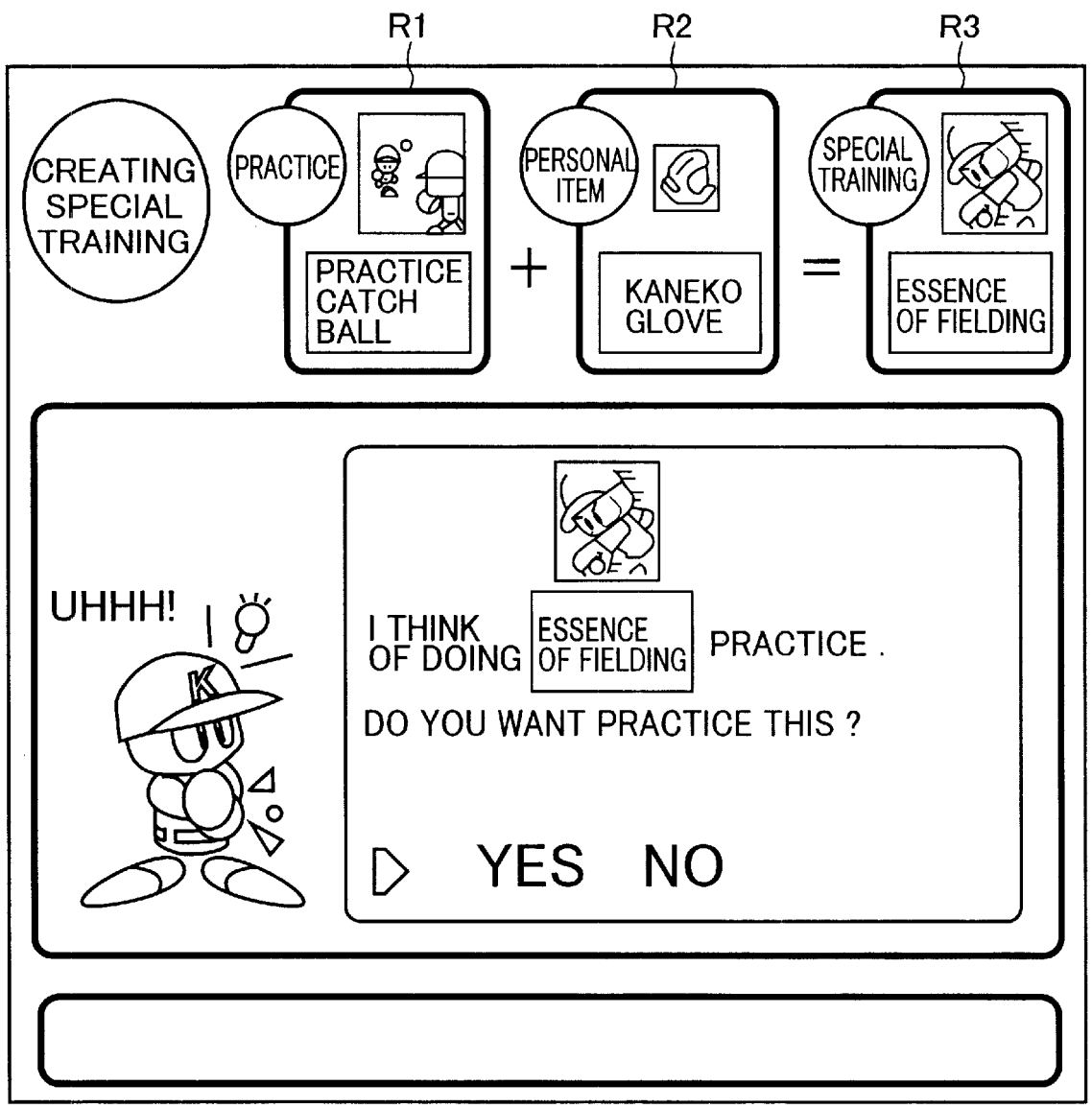
FIG. 7 is a diagram illustrating a screen for creating a new practice.
Figure 8:
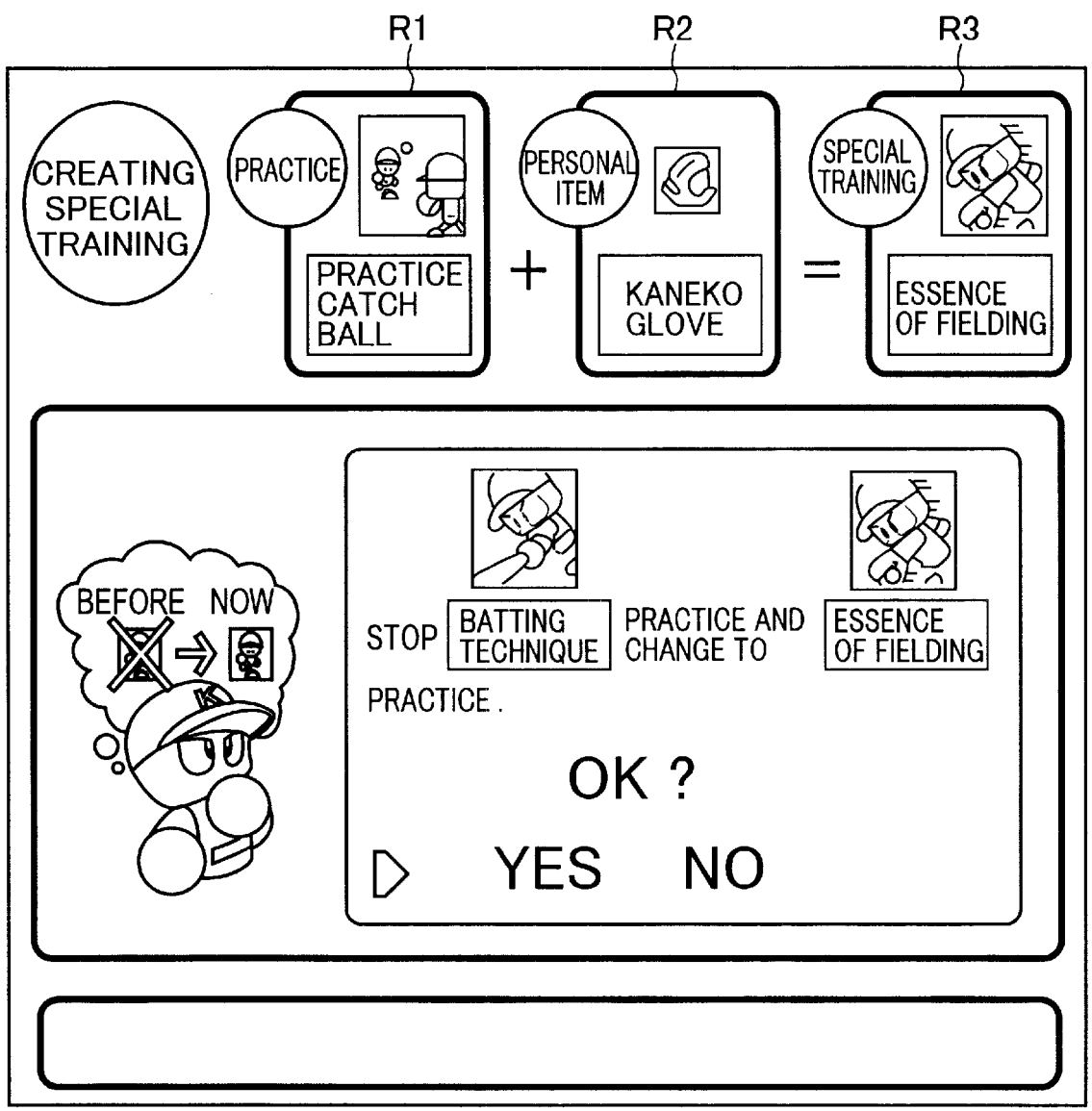
FIG. 8 is a diagram illustrating a screen for creating a new practice.
Figure 9:
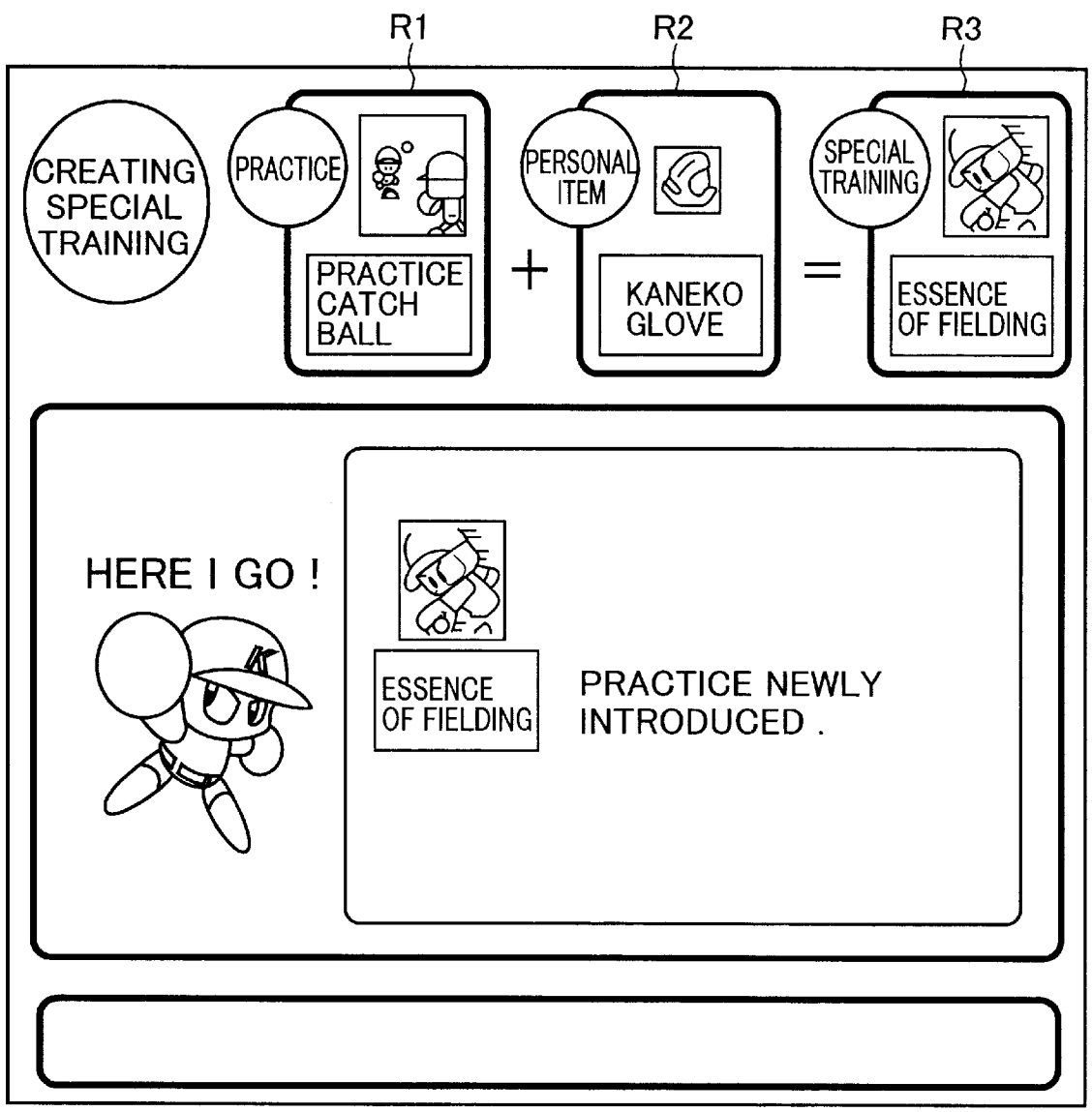
FIG. 9 is a diagram illustrating a screen for creating a new practice.

In other words, if the game character is a fielder, then as shown in FIG. 7, a screen confirming that "Essence of fielding" is acceptable as a new practice is displayed. Here, if the player selects "Yes", then as shown in FIG. 8, a screen is displayed confirming that the "Batting specialist" practice registered as a new practice in the previous operation is to be terminated and the character is to switch to "Essence of fielding" practice. If the player selects "Yes" here, then "Essence of fielding" is registered in the main memory 5 as a new practice, and a screen indicating that it has been registered is displayed, as illustrated in FIG. 9. If "No" is selected at either FIG. 7 or FIG. 8, then the display returns to the screen in FIG. 3, whereby the process of creating a new practice can be repeated.

Figure 10:
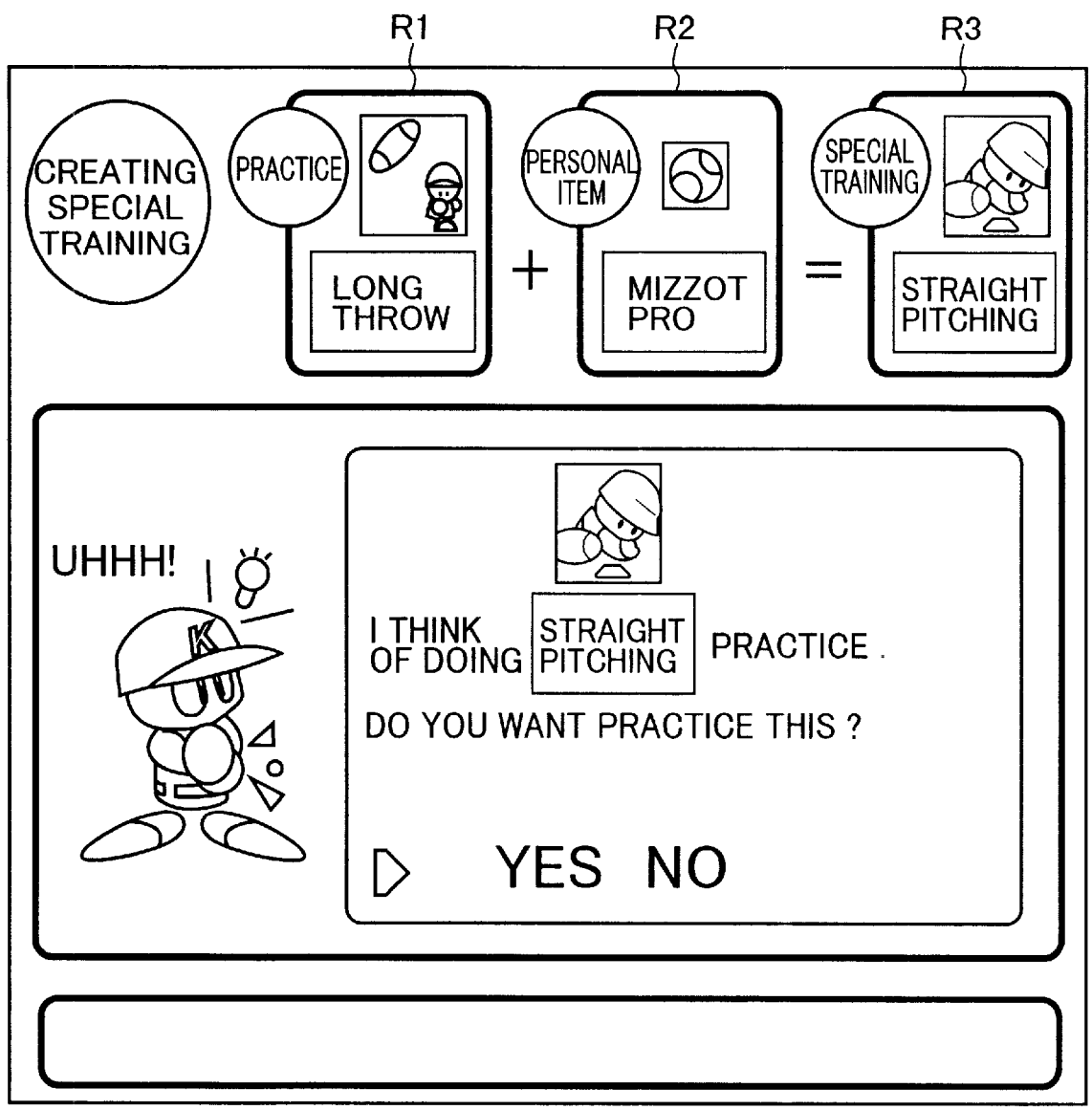
FIG. 10 is a diagram illustrating a screen for creating a new practice.
Figure 11:
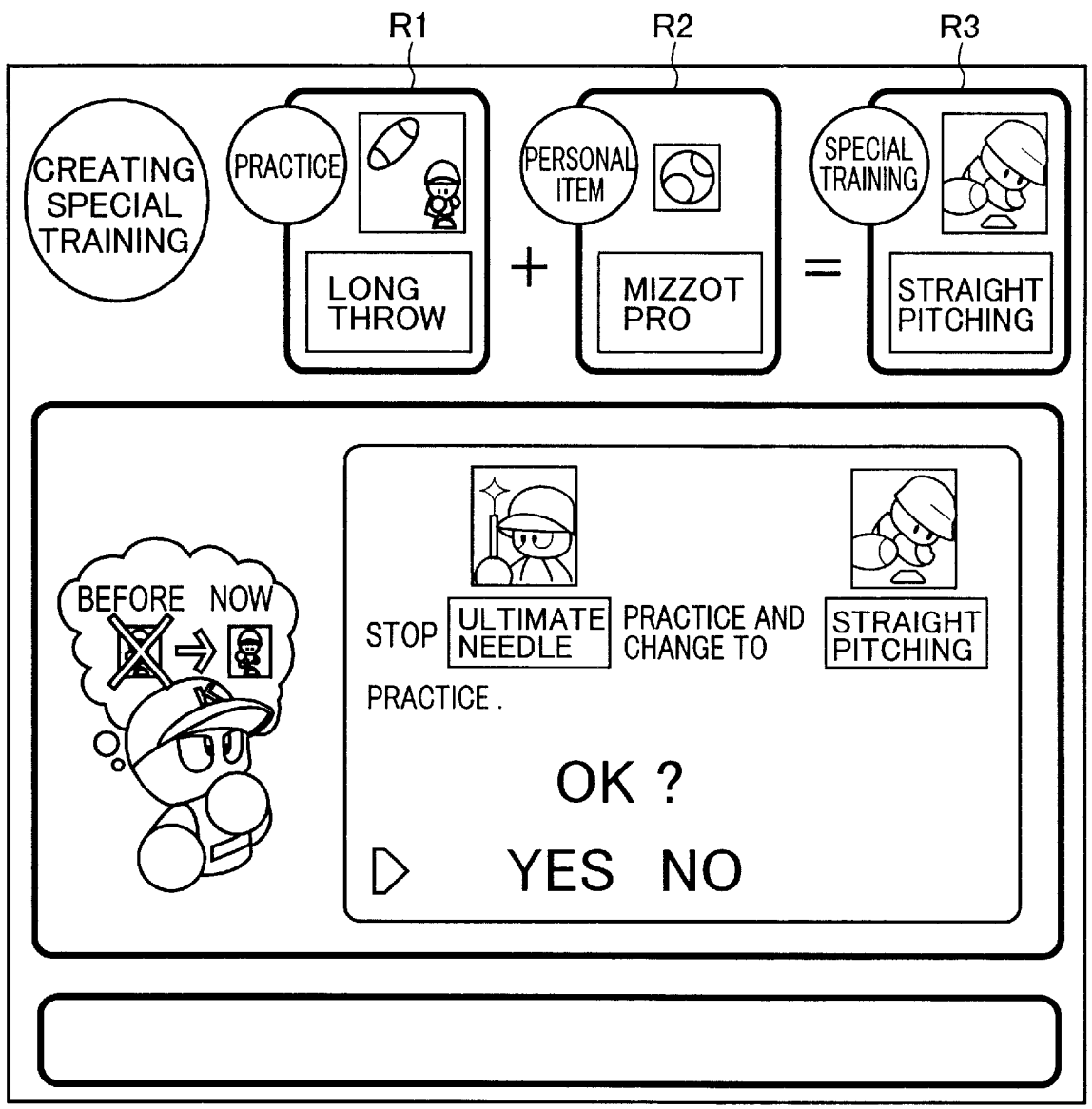
FIG. 11 is a diagram illustrating a screen for creating a new practice.
Figure 12:
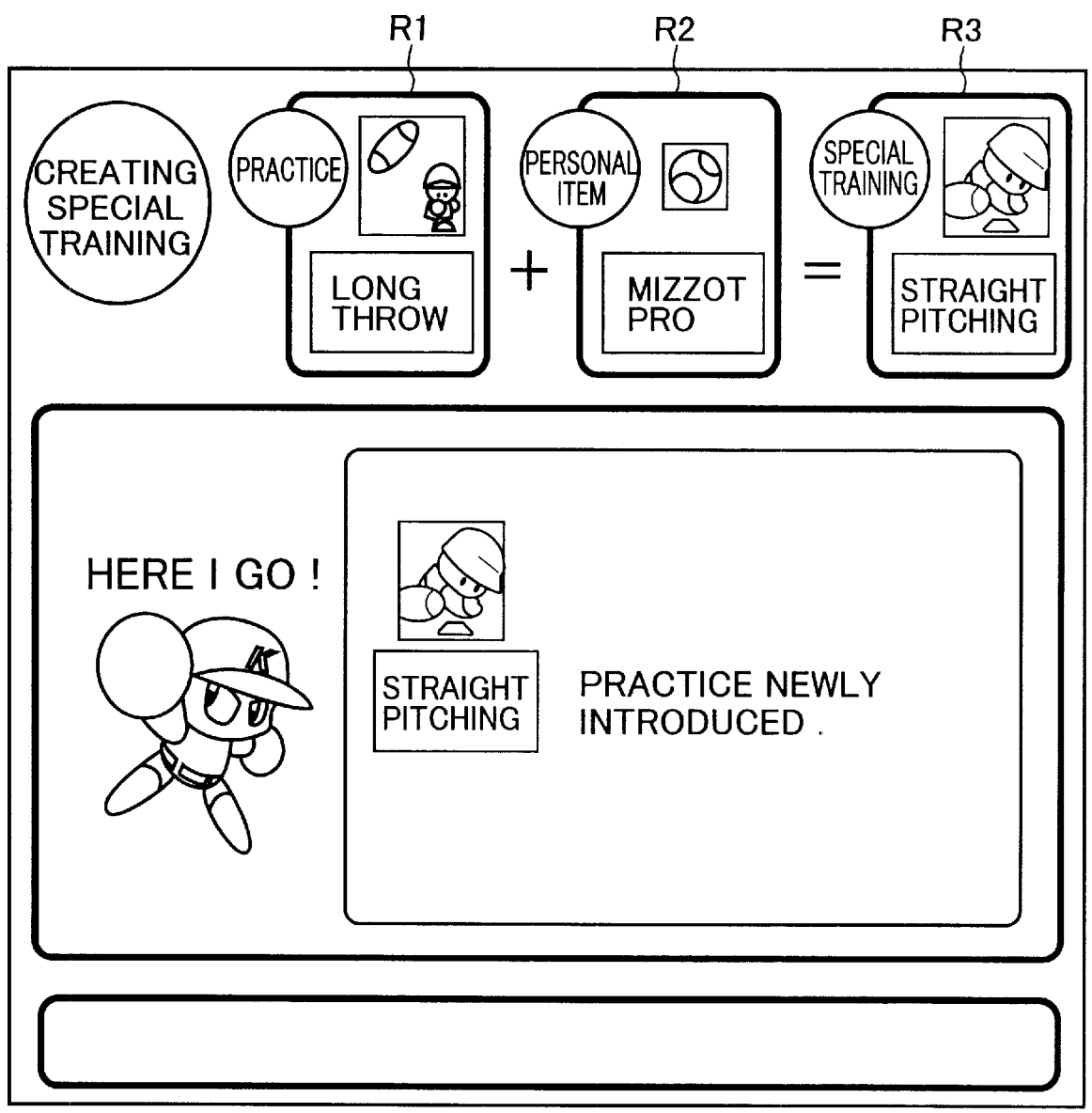
FIG. 12 is a diagram illustrating a screen for creating a new practice.

Furthermore, if the game character is a pitcher, then as shown in FIG. 10, a screen confirming that "Straight pitching" is acceptable as a new practice is displayed. Here, if the player selects "Yes", then as shown in FIG. 11, a screen is displayed confirming that the "Ultimate needle" practice registered as a new practice in the previous operation is to be terminated and the character is to switch to "Straight pitching" practice. If the player selects "Yes" here, then "Straight pitching" is registered in the main memory 5 as a new practice, and a screen indicating that it has been registered is displayed, as illustrated in FIG. 12. If "No" is selected at either FIG. 10 or FIG. 11, then the display returns to the screen in FIG. 4, whereby the process of creating a new practice can be repeated.

Furthermore, if the game character is a fielder and, for example, "running" is selected as a basic practice feature and "Mizzot shoes" is selected as an item, then a practice entitled "Tyre drag" is created as a new practice. This new practice is a practice in which the character drags a tyre across the ground by means of a rope, and by performing this new practice, the "muscular strength" is significantly improved, and, for example, the probability of the probability changing means 105 is changed, and the distribution of "remaining experience points" acquired by the character is also changed. Moreover, if, for example, "Sprinting" is selected as a basic practice feature and "Team supplied spikes" is selected as an item, then a practice entitled "Uphill sprint" is created as a new practice. This new practice involves running flat-out up a slope, and by performing this new practice, the "running power" of the character is significantly improved, and for example, the probability of the probability changing means 105 is changed, and the distribution of "remaining experience points" acquired by the character is also changed.

If the game character is a pitcher and if, for example, "Catch ball" is selected as a basic practice feature and "Apex glove" is selected as an item, then a practice entitled "Bunt fielding" will be created as a new practice. This new practice involves performing special bunt fielding training, and by performing this new practice, the "bunt fielding ability" of the character is significantly improved, and for example, the probability of the probability changing means 105 is changed, and the distribution of "remaining experience points" acquired by the character is also changed. Furthermore, if "Hitting mark" is selected as a basic practice feature and "Rokusho ball" is selected as an item, then a practice entitled "Target pitching" is created as a new practice. This new practice involves special training for throwing a ball at a target, and by performing this new practice, the "ball control ability" of the character is significantly improved, and, for example, the probability of the probability changing means 105 is changed, and the distribution of "remaining experience points" acquired by the character is also changed.

In this way, by selecting and combining basic practice features and items appropriately, it is possible for the player to create various new practices which do not exist in the predetermined basic practice features, as he or she desires, during the course of the game, thereby enabling the player to train the game character in a strategic manner and to play a game having a high level of interest not provided in the prior art. By performing new practices of this kind, both a fielder character and a pitcher character will accumulate fatigue, for example, which may have a detrimental effect on other factors.

Figure 13:
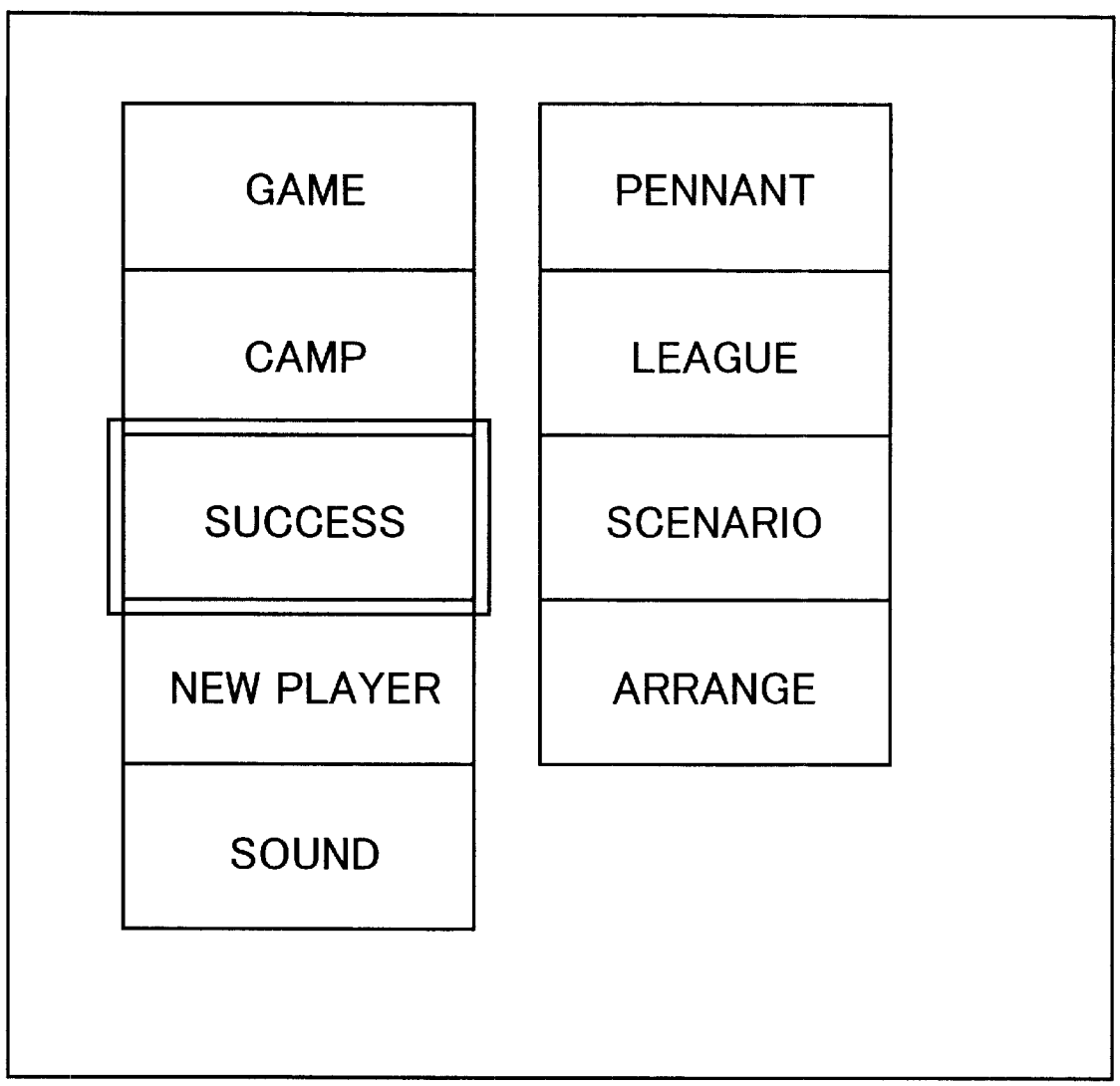
FIG. 13 is a diagram illustrating a game screen displayed on the monitor of the video game system shown in FIG. 1.
Figure 14:
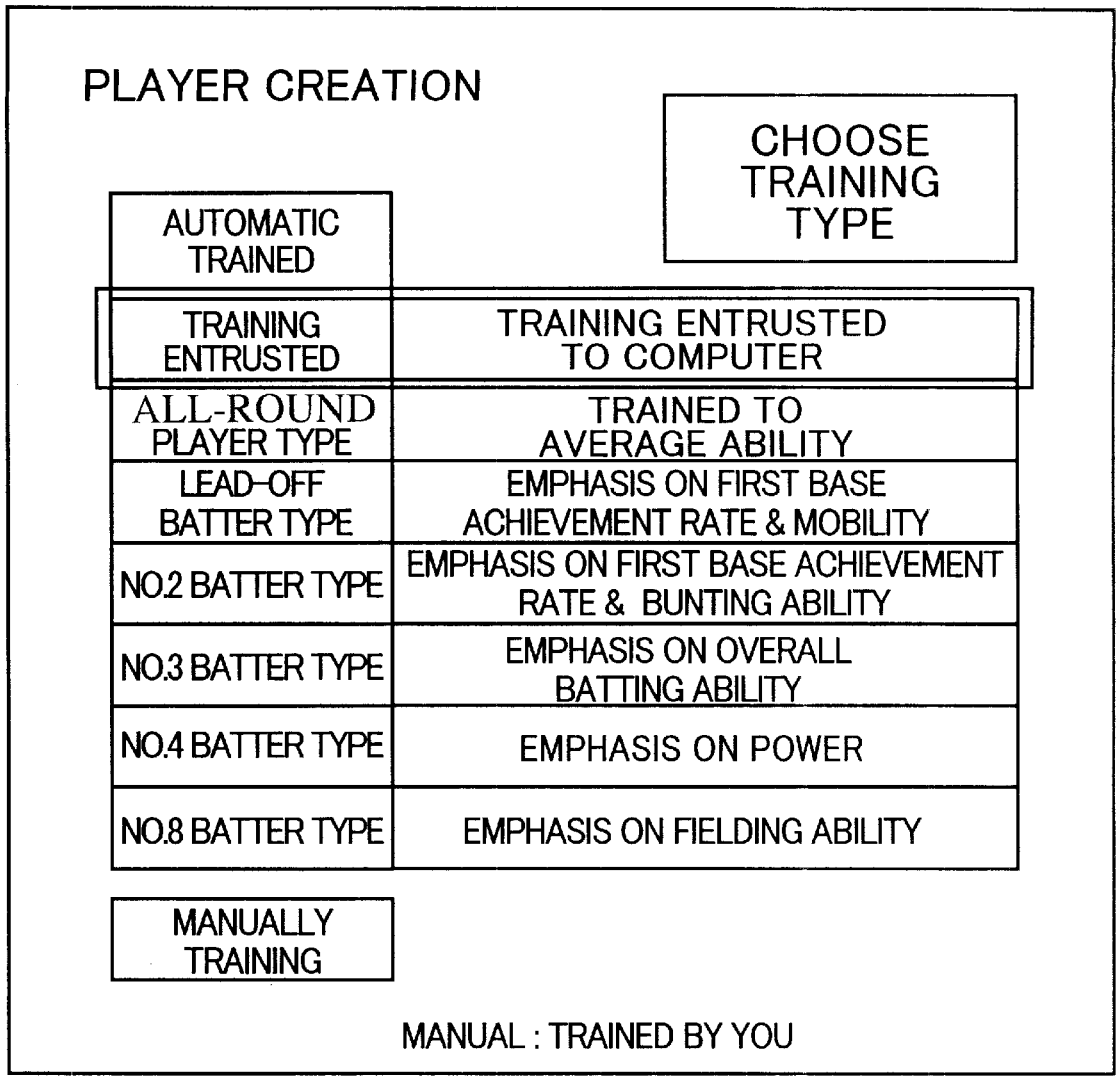
FIG. 14 is a diagram illustrating a game screen displayed on the monitor of the video game system shown in FIG. 1.

Next, the respective game screens displayed in a case where a success game is selected will be described briefly with reference to the game screen illustrated in FIG. 13 to FIG. 28. These game screens are examples for the purpose of describing a success game, and it is possible to constitute a success games using game screens different from these. Firstly, when a success game is selected at the initial screen shown in FIG. 13, the screen in FIG. 14 is displayed. This screen is used to register new player characters, and the registered items are broadly divided into "automatic training" and "manual training", and within the "automatic training", the options "training entrusted type", "all-round player type", "lead-off batter type"—"clean-up batter type (No. 4 batter type)" and "eighth batter type" can be selected.

If the "training entrusted type" is selected in FIG. 14, then the screen in FIG. 15 appears. This screen is used to input individual data for specifying the new player character, for example, data such as "name", "right or left handed", "fielding position", "form", and the like, and the currently set data contents are displayed on the top right of the screen. The lower portion of the display shows data corresponding to the individual data item where the cursor element is positioned, in such a manner that prescribed data can be selected therefrom by means of the cursor.

Figure 16:
FIG. 16 is a diagram illustrating a game screen displayed on the monitor of the video game system shown in FIG. 1.

When the respective data items have been input in FIG. 15, the screen in FIG. 16 appears. On this screen, the selectable options "Camp", "Recovery", "Improve ability", "Personal data" and "Evaluation", and the like, are displayed. Here, the cursor is placed over "Camp". FIG. 17 shows the screen when "Camp" is selected and designated. Here, the selectable options are "Batting", "Tee", "Sprint", "Run-in", "Batting for fielding", "Real fielding", "Muscle training", and "Return". According to these respective practice menus, the values of the acquired points, or "remaining experience points" (FIG. 26) are increased or reduced in accordance with probabilities generated by the probability changing means 105. For example, if "muscle training" is selected, then the "muscular strength" is increased, but the "technique" points can be reduced. Furthermore, "Return" is used to return to the previous screen.

Moreover, "Batting" differs from the other elements in that, depending on the abilities of the player, the "remaining experience points" are either increased or reduced, in accordance with probabilities generated by the probability generating means 105. In other words, a screen showing a batting practice pitcher pitching a ball is displayed, and the the game character is able to perform batting practice for a prescribed number of times. The player moves the meet cursor MC (see FIG. 22, indicates region where bat will strike ball) by means of prescribed buttons of the controller 29, or the like, and hits the ball pitched by the batting practice pitcher by operating a prescribed button, and hence is able to improve the "remaining experience points", in accordance with a probability from the probability changing means 105. If the batter makes a 'swing and miss' when the prescribed button is operated, then the "remaining experience points" are reduced.

Figure 19:
FIG. 19 is a diagram illustrating a game screen displayed on the monitor of the video game system shown in FIG. 1.

Moreover, if "Recovery" is selected in FIG. 16, then the screen in FIG. 18 will appear. On this screen, the options "Rest", "Play", "Return" are displayed. FIG. 19 shows a screen corresponding to FIG. 16, which differs in that a selectable option "Telephone" is displayed under the various conditions. Although not shown in the diagram, if the character enters hospital due to an injury or the like, representing a negative event, then "Recovery" and "Telephone" are displayed on the screen, and the "Camp" option is not available and hence is not displayed.

Figure 20:
FIG. 20 is a diagram illustrating a game screen displayed on the monitor of the video game system shown in FIG. 1.

If "Telephone" is selected in FIG. 19, then the screen in FIG. 20 appears. As shown on this screen, the "Telephone" call can be made to the "Coach", "Team mate" or "Home". Here, if the player phones the "Coach", then he will talk about various matters with the coach and, essentially, his "remaining experience points" will increase, whilst other points will decrease. If the player phones a "Team mate", then the evaluation of the manager will increase. Moreover, if the game character phones "Home", then the "Eagerness (Morale)" will increase, but other points will decrease. The actions performed by the adding and subtracting means are controlled by changes in the probabilities affected by the probability changing means 105 in accordance with these various factors.

Figure 21:
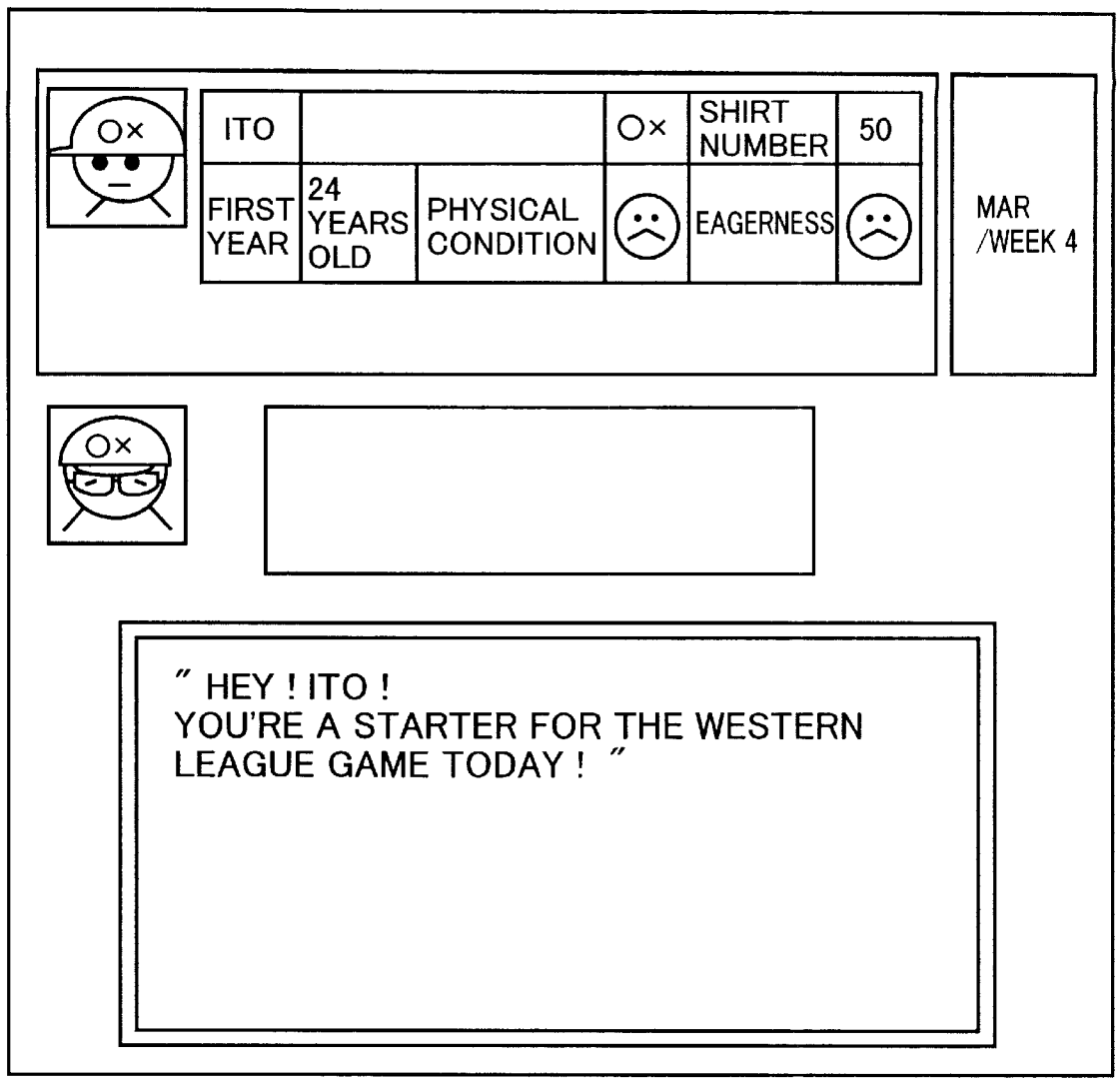
FIG. 21 is a diagram illustrating a game screen displayed on the monitor of the video game system shown in FIG. 1.
Figure 22:
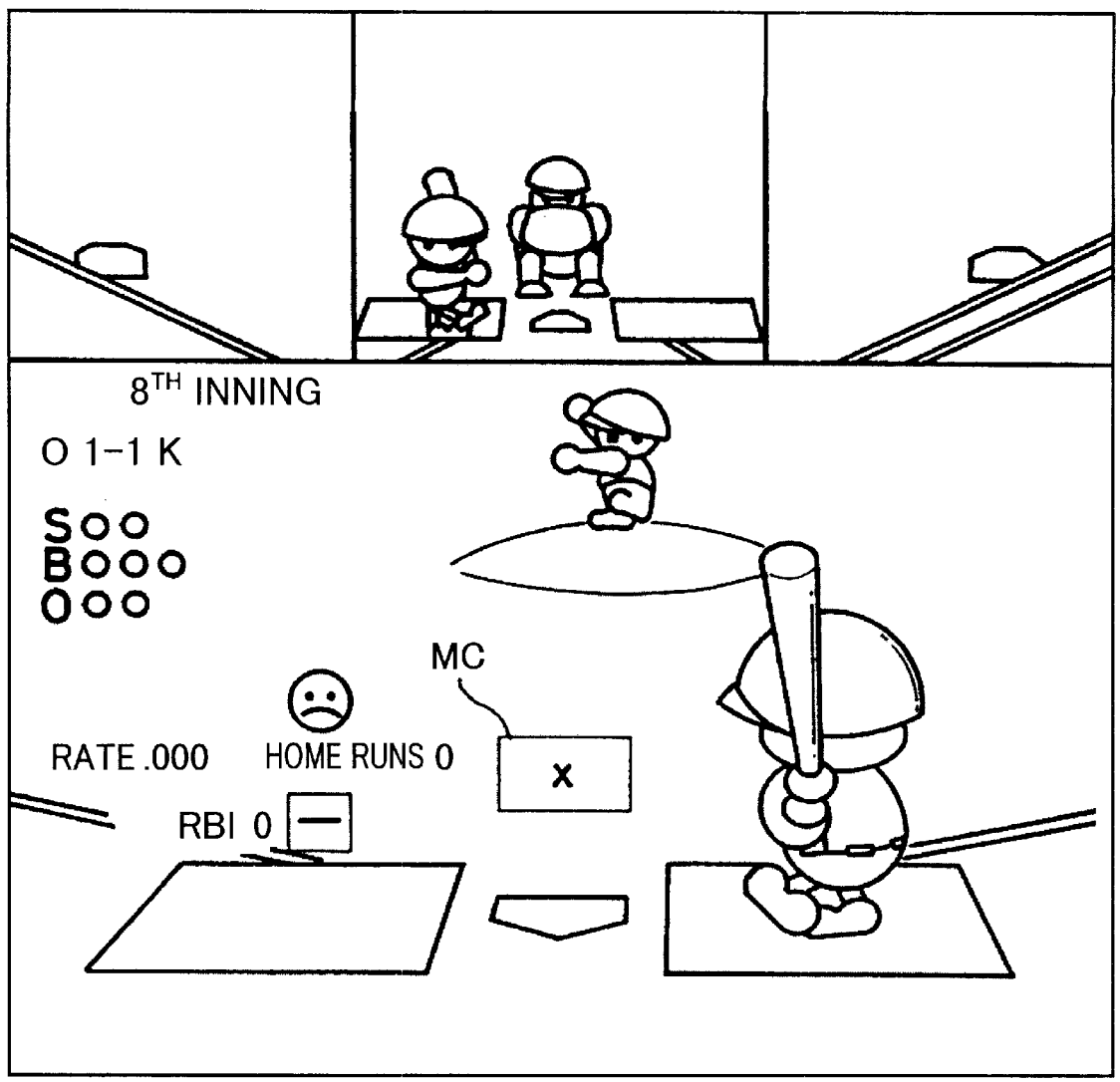
FIG. 22 is a diagram illustrating a game screen displayed on the monitor of the video game system shown in FIG. 1.

FIG. 21 is a screen of a conversation in which the coach's evaluation of the game character has increased and he tells the character to take part in a minor league game. FIG. 22 is the screen displayed following FIG. 21 and it shows a scene where the character participates in a minor league match as a batter. Here, the higher the number of hits he achieves, the more the coach's and manager's evaluation of the character will increase. FIG. 23 is a screen showing the results of the game in which the game character was a starting member, wherein the number of "strike outs" in particular, will lower the evaluation of the coach and manager, and reduce the character's chances of passing the trail.

Figure 24:
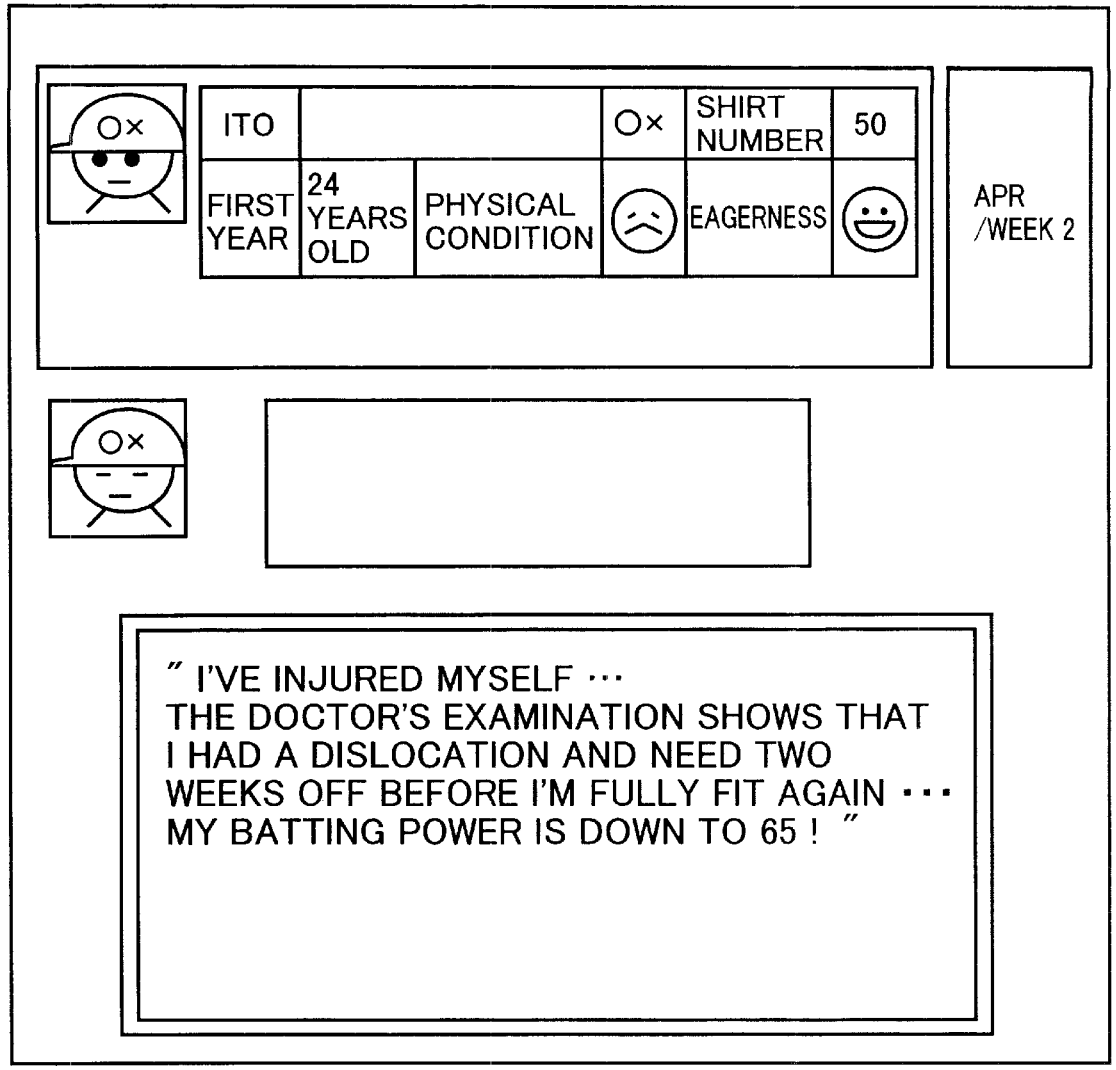
FIG. 24 is a diagram illustrating a game screen displayed on the monitor of the video game system shown in FIG. 1.

FIG. 24 is a screen showing a case where the game character suffers an injury, representing a negative event. FIGS. 25 to 27 are diagrams for describing the distribution of the "remaining experience points" to "abilities", as performed by the remaining experience points distributing means 106. FIG. 26 shows the lower part of the table in FIG. 25 as displayed by scrolling down, and it allows "remaining experience points" to be allocated in a similar manner to FIG. 25 and FIG. 27. Here, the "current ability" and "after change" ability option displays are omitted.

The numerical values in the tables shown in FIG. 25 and FIG. 26 indicates the number of "remaining experience points" required to upgrade an "ability" by one point. In FIG. 25, the "muscular strength" is 36 points, "batter power" is 65 points, and is "shoulder strength" is 8 points. In FIG. 27, the "batting power" value is increased by two points to 67 points and the "shoulder strength" value is increased by 1 point to 9 points, whereby the "remaining experience points" is reduced to 4 points (=36−4×2−24). In a similar manner, in FIG. 25, the "technique" points are 44, and in FIG. 27, these are reduced to 7 points (=44−5−32) by upgrading the "shoulder strength" and "fielding" abilities by one point each. This respective one-point upgrading of the "shoulder strength" and "fielding" abilities also reduces the "agility" to 50 points (=65−5−10).

Figure 28:
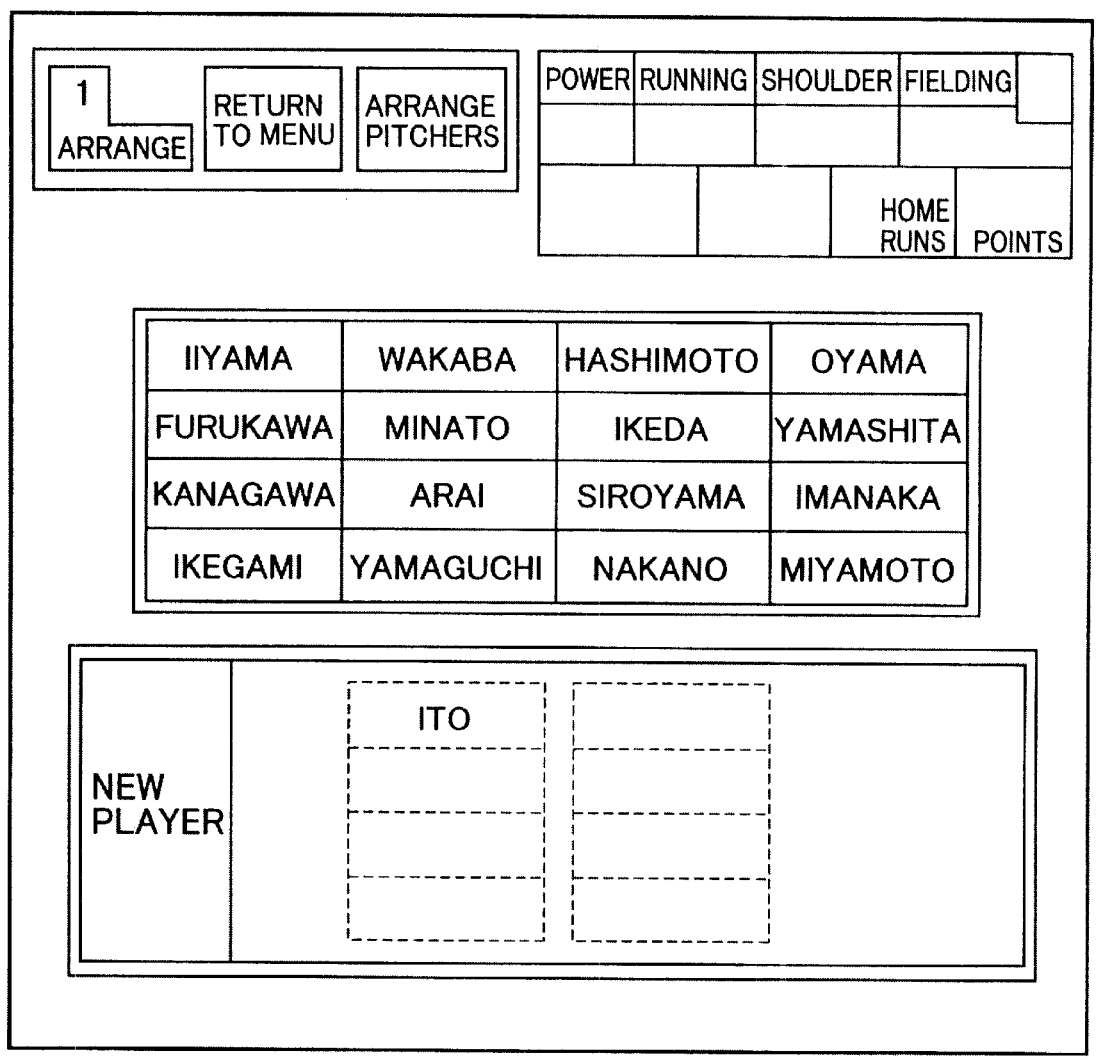
FIG. 28 is a diagram illustrating a game screen displayed on the monitor of the video game system shown in FIG. 1.

FIG. 28 is a screen for registering a prescribed competitor as a new player character, and if a new player character receives an order to go to a major league team from the manager, then the competitor's name is displayed in the grid at the bottom of this screen, and that competitor becomes able to play in major league matches. Although not shown in the drawings, if the trained new player character has moved up to a major league team, then when a competitive game is selected at the initial screen, that competitor becomes able to play in a major league match, and plays according to his abilities. The game player is able to train new player characters one at a time, up to a predetermined number of players.

Specifically, this success game is a game where a new player character joins a team, is trained to have characteristic abilities by repeating various practices and training other factors and psychological factors (speech and actions) until a prescribed number of years (for example, three years) have passed, whilst also passing through a minor league trial on the orders of the coach, and finally, the game character is promoted to a major league team on the orders of the manager.

Here, if "Create special training" is selected at FIG. 16, then if the game character is a fielder, a new practice is created by progressively displaying the screens shown in FIG. 3, FIG. 5, FIG. 7 and FIG. 9 described above, and if the game character is a pitcher, then a new practice is created by progressively displaying the screens shown in FIG. 4, FIG. 6, FIG. 10 and FIG. 12 described above. In other words, by creating new practices by selecting "Create special training" as appropriate during the course of the game, in such a manner that the game character can overcome its weak points, the player is able to train the game character in a strategic and efficient manner, and hence the player's interest in the game is enhanced. Moreover, in the present embodiment, only one new practice can be registered. Therefore, if a new practice has already been registered, then that registration is deleted when a further new practice is newly registered.

Figure 29:
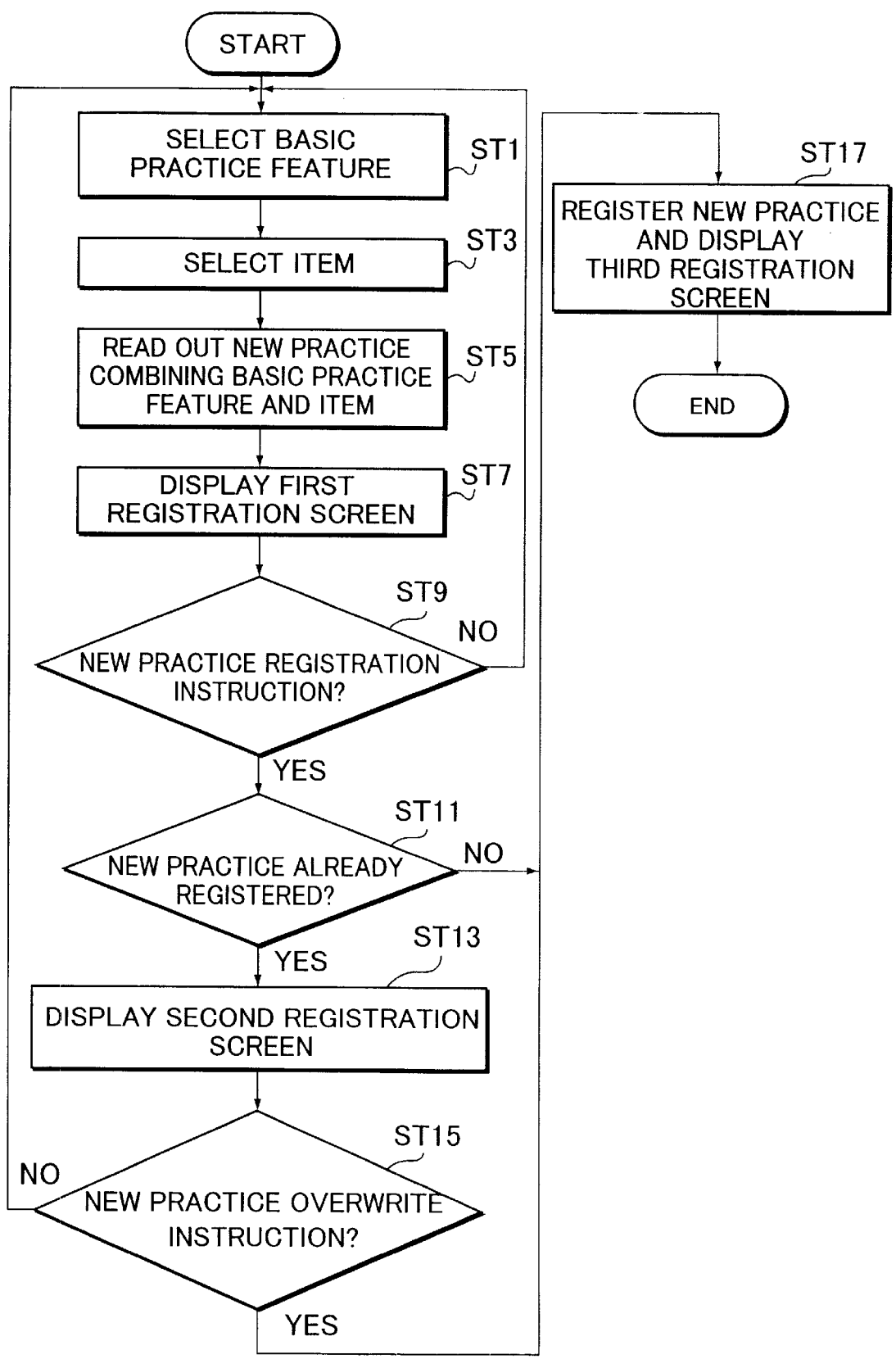
FIG. 29 is a flowchart for describing the operation of creating a new practice.

Next, the operation of creating a new practice is described with reference to the flowchart shown in FIG. 29. By selecting "Create special training" from the menu screen in FIG. 16, a screen as illustrated in FIG. 3 or FIG. 4 is displayed by the basic practice feature display means 113. In other words, if the game character forming a new player character is a fielder, then the screen in FIG. 3 is displayed, and if it is a pitcher, then the screen in FIG. 4 is displayed. Firstly, at the screen shown in FIG. 3 or FIG. 4, one basic practice feature is selected from the plural types of basic practice features (step ST1). For example, in FIG. 3 "Catch Ball" is selected and in FIG. 4, "Long throw" is selected, a "Catch ball" icon being displayed in the practice display region R1 of FIG. 3 and a "Long throw" icon being displayed in the practice display region R1 of FIG. 4, whereupon the screen shown in FIG. 5 or FIG. 6 is displayed by the item display means 114. In other words, if the game character is a fielder, then the screen in FIG. 5 is displayed, and if the game character is a pitcher, then the screen in FIG. 6 is displayed.

At the screen in FIG. 5 or FIG. 6, one item is selected from plural types of items (step ST3). For example, in FIG. 5, "Kaneko glove" is selected and in FIG. 6, "Mizzot Pro" is selected, whereby a "Kaneko glove" icon is displayed in the item display region R2 of FIG. 5 and a "Mizzot Pro" icon is displayed in the item display region R2 of FIG. 6. When an item is selected at step ST3, a new practice corresponding to the selected basic practice feature and item is read out from the new practice reading means 110 (step ST5), and this read out new practice is displayed in the new practice display region R3 in FIG. 5 or FIG. 6. For example, in FIG. 5, "Essence of fielding" is displayed as a new practice, and in FIG. 6, "Straight pitching" is displayed as a new practice.

Next, a first registration screen is shown on the monitor 22 by the registration screen display means 115 (step ST7). In other words, if the game character is a fielder, then the screen in FIG. 7 is displayed, and if the game character is a pitcher, then the screen in FIG. 10 is displayed. It is determined whether or not an instruction to register the read out new practice has been issued, according to whether the player selects the "Yes" or "No" option displayed on FIG. 7 or FIG. 10, by means of prescribed button operation on the controller 29 (step ST9). In order to execute the judgement operation in step ST9, the CPU 1 comprises function executing means which perform as appropriate judging means, but description thereof is omitted in FIG. 2.

If the judgement is affirmative at step ST9, then it is judged whether a new practice (previous new practice) is already registered (step ST11). In order to execute the judgement operation in step ST11, the CPU 1 comprises function executing means which perform as appropriate judging means, but description thereof is omitted in FIG. 2. Thereupon, if the judgement at step ST11 is affirmative, then the registration screen in FIG. 2 is displayed on the monitor 22 (step ST13).

In other words, if the game character is a fielder, then the screen in FIG. 8 is displayed, and if the game character is a pitcher, then the screen in FIG. 11 is displayed. Here, it is determined whether or not an instruction to overwrite (register over) the previously created new practice has been issued, according to whether the player selects the "Yes" or "No" option displayed on FIG. 8 or FIG. 11, by means of prescribed button operation on the controller 29 (step ST15). In order to execute the judgement operation in step ST15, the CPU 1 comprises function executing means which perform as appropriate judging means, but description thereof is omitted in FIG. 2.

If the judgement at step ST15 is affirmative (in other words, if "Yes" is selected in FIG. 8 or FIG. 11), then the new practice is registered and a third registration screen is displayed on the monitor 22 (step ST17). In other words, if the game character is a fielder, then the screen in FIG. 9 is displayed, and if the game character is a pitcher, then the screen in FIG. 12 is displayed.

If the judgement at step ST9 is negative (in other words, if "No" is selected in FIG. 7 or FIG. 10), then the procedure returns to step STI. Moreover, if the judgement at step ST15 is negative (in other words, if "No" is selected in FIG. 8 or FIG. 11), then the procedure return to step STI. If the judgement is negative at step ST11, then the procedure moves to step ST17.

In the video game system relating to the present embodiment composed as described above, since one basic practice feature is selected from plural types of previously determined basic practice features, one item is selected from plural types of previously determined items, and a practice having new contents is created by combining the selected basic practice feature and item, then the player is able to train a game character strategically by improving the abilities of the game character forming a new player character by selecting "Create special training" from the menu screen and creating new practices, as appropriate, during the course of the game.

The present invention is not limited to the aforementioned embodiment, and various modifications thereof can be adopted as described below.

(1) In the aforementioned embodiment, the screen for selecting a basic practice feature and the screen for selecting an item, in order to create a new practice, were constituted by mutually independent screens, but it is possible to adopt a composition where select a basic practice feature and item from the same screen.

(2) In the aforementioned embodiment, the basic practice feature and item for creating a new practice are selected by choosing single icons from a displayed list of icons (in other words, basic practice features), but it is also possible, for example, to select same by directly input a character, symbol, code, or the like, to the practice display region R1 and the item display region R2 shown in FIG. 3, FIG. 4, and the like, by means of operating prescribed buttons.

(3) In the aforementioned embodiment, a case where the present invention is applied to a baseball game was described, but the present invention may also be applied to other sports games besides a baseball game, and other games besides sports games. In the case of a sports-related success game, there are many technical abilities performed in the sport that form objects for training, but in the case of other games, for example, negotiating ability, selling ability, or the like, may form objects for training, and factors other than abilities, such as characteristics, or the like, may form objects for training. These abilities, characteristics, or the like forming training objects are called attributes.

(4) In the aforementioned embodiment, a basic practice feature is selected in order to create a new practice, but if a new practice has already been created and registered, then it is also possible to create a further new practice by selecting the existing new practice. In this way, if a new practice has already been registered, then this new practice forms a previously determined practice feature.

As described above, the video game device relating to the present invention comprises: practice selecting means for selecting one practice feature from predetermined practice features of plural types; item selecting means for selecting one item from predetermined items of plural types; and new practice creating means for creating a practice having new contents by combining a selected practice feature and item. Moreover, the new practice creating method and the readable storage medium storing a new practice creating program for a video game according to the present invention comprises: a first step of selecting one practice feature from predetermined practice features of plural types; a second step of selecting one item from predetermined items of plural types; and a third step of creating a practice having new contents by combining a selected practice feature and item.

Thereby, by creating new practices by selecting "Create special training" from the menu screen during the course of the game, and causing a game character forming a new player character in such a manner that the game character can overcome its weak points by creating new practices by selecting "Create special training" as appropriate during the course of the game, in such a manner that the abilities of the game character are improved, the player is able to train the game character in a strategic manner, and hence the player's interest in the game is enhanced.

Moreover, in the present invention, the practice selecting means may be constituted by: practice display means displaying a list of practice names of plural types on a monitor, and cursor movement display means for progressively displaying a cursor over one practice feature of the displayed practice feature names. Moreover, in the present invention, the first step may comprise: a step of displaying a list of practice feature names of plural types on the monitor; and a step of moving and displaying a cursor over one practice feature name of the displayed list of practice feature names, according to instructions from the operating member. Thereby, a new practice can be selected readily and reliably, and hence the interest generated by the game is increased.

Moreover, in the present invention, the item selecting means may be constituted by: item display means displaying a list of item names of plural types on a monitor, and cursor movement display means for progressively displaying a cursor over one item name of the displayed item names. In the present invention, the second step may comprise: a step of displaying a list of item names of plural types on the monitor; and a step of moving and displaying a cursor over one item name of the displayed list of item names, according to instructions from the operating member. Thereby, a new item can be selected readily and reliably, and hence the interest generated by the game is increased.

Moreover, the present invention may comprise: storing means for storing new practices of plural types set according to combinations of selected practices and items, wherein the new practice creating means comprises: practice reading means for reading a new practice set according to a combination of a selected practice and item, from the storing means; and practice registering means for registering the read out new practice in prescribed storing means. Moreover, the present invention may also be such that new practices of plural types corresponding to selected practices and items are stored in a prescribed storing means, and the third step comprises: a step of reading out a new practice set according to a combination of a selected practice feature and item; and a step of registering the read out new practice in the prescribed storing means. Thereby, a new practice can be created readily and reliably, and hence the interest generated by the game is increased.

As described in the foregoing, according to the present invention, since one basic practice feature is selected from plural types of previously determined basic practice features, one item is selected from plural types of previously determined items, and a practice having new contents is created by combining the selected basic practice feature and item, then the player is able to train a game character strategically by improving the abilities of the game character forming a new player character by selecting "Create special training" from the menu screen and creating new practices, as appropriate, during the course of the game, and hence the interest generated by the game is increased.

This application is based on Japanese Patent Application Serial No. 2000-119071 filed on Apr. 20, 2000, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A video game device, wherein the abilities of a game character displayed on a monitor are caused to improve by executing predetermined specific practices during the course of a game in which the game character is caused to approach training target values by performing actions corresponding to instructions from an operating member, said video game device comprising:

practice selecting means for selecting one practice feature from predetermined practice features of plural types;

item selecting means for selecting one item from predetermined items of plural types; and new practice creating means for creating a new practice having new contents by combining a selected practice feature and a selected item;

wherein said operating member can instruct performance of a practice created by said new practice creating means.

2. The video game device according to claim 1, further comprising storing means for storing the newly created practice in tabular form having information representing a name of the newly created practice and contents thereof.

3. The video game device according to claim 2, wherein said new practice creating means including new practice read out means for reading out the new practice from the storing means and new practice registering means for registering the read out new practice in a prescribed region of the storing means.

4. The video game device according to claim 3, wherein the registered new practice can be retracted by the operation of a prescribed button on said operating member.

5. A new practice creating method for a video game, wherein abilities of a game character displayed on a monitor are caused to improve by executing predetermined specific practices during the course of a game in which the game character is caused to approach training target values by performing actions corresponding to instructions from an operating member, said new practice creating method comprising:

a first step of selecting one practice feature from predetermined practice features of plural types;

a second step of selecting one item from predetermined items of plural types; and a third step of creating a practice having new contents by combining a selected practice feature and a selected item.

6. A readable storage medium storing a new practice creating program for a video game, wherein abilities of a game character displayed on a monitor are caused to improve by executing predetermined specific practices during the course of a game in which the game character is caused to approach training target values by performing actions corresponding to instructions from an operating member, said new practice creating program comprising:

a first step of selecting one practice feature from predetermined practice features of plural types;

a second step of selecting one item from predetermined items of plural types; and a third step of creating a practice having new contents by combining a selected practice feature and a selected item.

7. The readable storage medium storing a new practice creating program according to claim 6, wherein said first step comprises: a step of displaying a list of practice feature names of plural types on the monitor; and a step of moving and displaying a cursor over one practice feature name of the displayed list of practice feature names, according to instructions from said operating member.

8. The readable storage medium storing a new practice creating program according to claim 6, wherein said second step comprises: a step of displaying a list of item names of plural types on the monitor; and a step of moving and displaying a cursor over one item name of the displayed list of item names, according to instructions from said operating member.

9. A storage medium storing a new practice creating program according to claim 6, wherein new practices of plural types corresponding to selected practices and items are stored in prescribed storing means, and said third step comprises: a step of reading out a new practice set according to a combination of a selected practice feature and item; and a step of registering the read out new practice in the prescribed storing means.

* * * * *